United States Patent
Krasley et al.

(10) Patent No.: US 12,524,129 B2
(45) Date of Patent: Jan. 13, 2026

(54) METHODS AND SYSTEMS FOR ADAPTIVE APPAREL DESIGN AND APPAREL INFORMATION ARCHITECTURE

(71) Applicant: Shimmy Technologies Group, Inc., Brooklyn, NY (US)

(72) Inventors: Sarah Krasley, Brooklyn, NY (US); Chisato Sakamoto, Brooklyn, NY (US)

(73) Assignee: SHIMMY TECHNOLOGIES GROUP, INC., Brooklyn, NY (US)

( * ) Notice: Subject to any disclaimer, the term of this patent is extended or adjusted under 35 U.S.C. 154(b) by 43 days.

(21) Appl. No.: 17/467,892

(22) Filed: Sep. 7, 2021

(65) Prior Publication Data

US 2022/0122483 A1 Apr. 21, 2022
US 2022/0293005 A9 Sep. 15, 2022

Related U.S. Application Data

(63) Continuation-in-part of application No. PCT/US2020/021740, filed on Mar. 9, 2020.

(60) Provisional application No. 62/815,280, filed on Mar. 7, 2019.

(51) Int. Cl.
| | |
|---|---|
| *G09B 5/06* | (2006.01) |
| *G06F 3/0482* | (2013.01) |
| *G06F 3/16* | (2006.01) |
| *G06T 19/20* | (2011.01) |
| *G06F 113/12* | (2020.01) |

(52) U.S. Cl.
CPC ............ *G06F 3/0482* (2013.01); *G06F 3/167* (2013.01); *G06T 19/20* (2013.01); *G09B 5/06* (2013.01); *G06F 2113/12* (2020.01); *G06T 2200/24* (2013.01); *G06T 2219/2004* (2013.01); *G06T 2219/2016* (2013.01)

(58) Field of Classification Search
CPC . G09B 5/06; A41H 42/00; A41H 3/04; A41H 1/02; A41H 1/00; A41H 3/00; A41H 1/10; A41H 43/02; A41H 3/02; A41H 3/06; A41H 3/08; A41H 43/005; A41H 3/007
See application file for complete search history.

(56) References Cited

U.S. PATENT DOCUMENTS

| | | |
|---|---|---|
| 2004/0049309 A1 | 3/2004 | Gardner et al. |
| 2010/0076859 A1 | 3/2010 | Fernandez |
| 2010/0305909 A1 | 12/2010 | Wolper et al. |
| 2014/0114620 A1 | 4/2014 | Grinspun et al. |
| 2014/0277663 A1 | 9/2014 | Gupta et al. |
| 2016/0063587 A1 | 3/2016 | Fry et al. |
| 2018/0012420 A1 | 1/2018 | Ngo Ngoc et al. |

OTHER PUBLICATIONS

International Search Report and Written Opinion issued Jul. 17, 2020 in International Appl. No. PCT/US2020/021740.

*Primary Examiner* — Robert J Utama
(74) *Attorney, Agent, or Firm* — Duane Morris LLP; Thomas J. Kowalski

(57) ABSTRACT

Systems and methods for training a user to label and code digital files for three-dimensional garment design are provided. Systems and methods for collaborative refining of digital and/or physical garment prototypes are also provided.

14 Claims, 36 Drawing Sheets

METHODS AND SYSTEMS FOR ADAPTIVE APPAREL DESIGN AND APPAREL INFORMATION ARCHITECTURE

RELATED APPLICATIONS AND INCORPORATION BY REFERENCE

This application is a continuation-in-part application of international patent application Serial No. PCT/US20/021740 filed 9 Mar. 2020, which published as PCT Publication No. WO 2020/181286 on 10 Sep. 2020, which claims priority to U.S. provisional patent application Ser. No. 62/815,280 filed 7 Mar. 2019.

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FIELD OF THE INVENTION

This invention pertains to attracting, training, and contracting cutting, sewing, digital design and machine operators for employment in the manufacturing industry via a mobile phone based software application.

BACKGROUND OF THE INVENTION

Many conventional apparel design-to-manufacture workflows are outdated and inefficient. For example, apparel designers generally rely on manual data entry. Institutional knowledge is not often captured or codified. Communication between design teams and manufacturing vendors is confusing and inefficient. There are increased demands on designers for speed and more styles.

Furthermore, automation in the apparel industry is expected to cause major disruptions, most notably the mass displacement of garment workers around the world. The replacement of workers with machines is expected to disproportionately impact women, as they make up the majority of the apparel workforce and are concentrated at lower positions on the supply chain.

Citation or identification of any document in this application is not an admission that such document is available as prior art to the present invention.

SUMMARY OF THE INVENTION

Embodiments provided herein include systems and methods for training a user to label and code digital files for three-dimensional garment design. Embodiments provided herein also include system and methods for collaborative refining of digital and/or physical garment prototypes.

An embodiment includes a system for training a user to label and code digital files for three-dimensional garment design. The system includes: a database storing at least one digital file including a pattern having multiple pattern pieces; a user interface implemented through a computing device, the user interface configured to provide visual and auditory instructions in a local language of the user for each module in a plurality of learning modules; and computer executable instructions that when executed by one or more processors implement the plurality of learning modules including a setup for cutting module. The setup for cutting module: displays a visual representation of each of the multiple pattern pieces for identification of types of pattern pieces and numbers of pieces to cut; displays identifiers of different types of pattern pieces, each identifier including a name of the type of pattern piece in the local language; displays identifiers for numbers of pattern pieces to cut, each identifier including a name of the number of pattern pieces in the local language; for each pattern piece, receives a selection of the visual representation of the pattern piece, receives a selection of a corresponding identifier for the type of pattern piece, and provides a visual indication of whether the selection of the corresponding identifier for the type of pattern piece is correct; and for each pattern piece, receives a selection of a number of pattern pieces to cut and provides a visual indication of whether the selection of the number of pattern pieces to cut is correct.

In some embodiments, the system also includes computer executable instructions that when executed by the one or more processors implement a creation of markers for layout module that: provides a visual representation of each of the multiple pattern pieces for layout for cutting with each visual representation including a grain line for the pattern piece; provides a visual representation of material on which to lay out the pattern pieces; displays controls for different types of transformation operations; receives a selection of at least one of the multiple pattern pieces, a selection of a control for a transformation operation on the selected at least one pattern piece, and displays a visual representation of the transformation performed on the at least one pattern piece; and for each of the multiple pattern pieces, receives a selection of the pattern piece and a movement of the selected pattern piece onto the visual representation of the material and rendering the movement and positioning of the selected pattern piece on a display of the user interface.

In some embodiments, the system also includes computer executable instructions that when executed by the one or more processors implement a digital assembly module that: displays a visual representation of a front side of a three-dimensional model, and a visual representation of a back side of a three-dimensional model for fitting the pattern to the model; displays a visual representation of each of the multiple pattern pieces for fitting on the three dimensional model; receives a selection of at least one of the multiple pattern pieces, a selection of a control for a transformation operation on the selected at least one pattern piece, and display a visual representation of the transformation performed on the at least one pattern piece; and for each of the multiple pattern pieces, receives a selection of the pattern piece and a movement of the selected pattern piece onto one of the visual representations of the three-dimensional model and rendering the movement and positioning of the selected pattern piece on the display of the user interface.

In some embodiments, the system also includes computer executable instructions that when executed by the one or more processors implement a pattern piece identification module that: displays examples of different types of pattern pieces each labeled with the type of pattern piece in the local language; for each example pattern piece, prompts the user to speak the name of the type of example pattern piece in the local language, and records the spoken name of the type of example pattern piece; and provides data representative of the spoken name of the example pattern along and an identification of the type of example pattern piece to a natural language processing system to improve natural language processing of garment-related language in the user's local language with the user's dialect.

In some embodiments, the pattern piece identification module further: displays a visual representation of each of the multiple pattern pieces for identification of the pattern pieces; displays identifiers of different types of pattern pieces, each identifier including a name of the type of pattern piece in the local language; and for each pattern piece, receives a selection of the visual representation of the pattern piece, receives a selection of a corresponding identifier for the type of pattern piece, and provides a visual indication of whether the selection of the corresponding identifier for the type of pattern piece is correct.

In some embodiments, the display of controls for different types of transformation operations includes display of schematic depictions of the transformation operations. In some embodiments, the display of identifiers of different types of pattern pieces and the display of the one or more identifiers for numbers of pattern pieces to cut is in response to receiving the selection of the visual representation of the pattern piece. In some embodiments, the display of controls for different types of transformation operations is in response to the selection of at least one of the multiple pattern pieces. In some embodiments, the transformation operations include rotate, reflect, and copy.

In some embodiments, the system further includes computer executable instructions that when executed by the one or more processors cause the user interface to: display a login interface to the user; and receive information regarding a username and a password from the user.

In some embodiments, the system further includes computer executable instructions that when executed by the one or more processors cause the system to access information regarding a mobile address of the computing device and store the accessed information regarding the mobile address and information associating the mobile address with a user.

In some embodiments, the system further includes computer executable instructions that when executed by the one or more processors cause the system to store information regarding the users' completion of each module associated with information identifying the user.

In some embodiments, the system further includes computer executable instructions that when executed by the one or more processors cause the system to record information regarding correct and incorrect selections by the user, regarding correct and incorrect positioning of pattern pieces on the visual representation of the material, regarding correct and incorrect movements of pattern pieces onto the visual representation of the material, and/or regarding correct and in movements of pattern pieces onto the visual representations of the three-dimensional model.

In some embodiments, the system further includes computer executable instructions that when executed by the one or more processors cause the system to transmit information to the user via the computing device after completion of one or more modules. In some embodiments, the information transmitted is based, at least in part, on one or more scores of the user's performance during one or more of the learning modules.

In some embodiments, the system further includes computer executable instructions that when executed by the one or more processors cause the user interface to display graphical indicators of successful completion of one or more modules within a training session and during one or more prior training sessions.

In some embodiments, the user interface is implemented and the plurality of learning modules is implemented as a web-based application on the computing device that is hosted by a remote server.

In some embodiments, the computing device includes a touch screen and at least some of the user selections are received via a touch screen interface of the computing device.

An embodiment includes method for training a user to label and code digital files for three-dimensional garment design. The method includes: providing visual and auditory instructions in a local language of the user on a computing device; displaying a visual representation of each of the multiple pattern pieces for identification of types of pattern pieces and numbers of pieces to cut; displaying identifiers of different types of pattern pieces, each identifier including a name of the type of pattern piece in the local language; displaying identifiers for numbers of pattern pieces to cut, each identifier including a name of the number of pattern pieces in the local language; for each pattern piece, receiving a selection of the visual representation of the pattern piece, receiving a selection of a corresponding identifier for the type of pattern piece, and providing a visual indication of whether the selection of the corresponding identifier for the type of pattern piece is correct; and for each pattern piece, receiving a selection of a number of pattern pieces to cut and providing a visual indication of whether the selection of the number of pattern pieces to cut is correct.

In some embodiments, the method also includes: providing a visual representation of each of the multiple pattern pieces for layout for cutting with each visual representation including a grain line for the pattern piece; providing a visual representation of material on which to lay out the pattern pieces; displaying controls for different types of transformation operations; receiving a selection of at least one of the multiple pattern pieces, a selection of a control for a transformation operation on the selected at least one pattern piece, and displaying a visual representation of the transformation performed on the at least one pattern piece; and for each of the multiple pattern pieces, receiving a selection of the pattern piece and a movement of the selected pattern piece onto the visual representation of the material and rendering the movement on a display of the computing device.

In some embodiments, the method also includes: displaying a visual representation of a front of a three-dimensional model and a visual representation of a back of a three-dimensional model for fitting the pattern to the model; displaying a visual representation of each of the multiple pattern pieces for fitting on the three-dimensional model; receiving a selection of at least one of the multiple pattern pieces, a selection of a control for a transformation operation on the selected at least one pattern piece, and displaying a visual representation of the transformation performed on the at least one pattern piece; and for each of the multiple pattern pieces, receiving a selection of the pattern piece and a movement of the selected pattern piece onto the visual representation of the material and rendering the movement on the display.

In some embodiments, the method also includes: displaying examples of different types of pattern pieces each labeled with the type of pattern piece in the local language; for each example pattern piece, prompting the user to speak the name of the type of example pattern piece in the local language, and recording the spoken name of the type of example pattern piece; and providing data representative of the spoken name of the example pattern along and an identification of the type of example pattern piece to a natural language processing system to improve natural language processing of garment-related language in the user's local language with the user's dialect.

In some embodiments, the method also includes: displaying a visual representation of each of the multiple pattern pieces for identification of the pattern pieces; displaying identifiers of different types of pattern pieces, each identifier including a name of the type of pattern piece in the local language; and for each pattern piece, receiving a selection of the visual representation of the pattern piece, receive a selection of a corresponding identifier for the type of pattern piece, and providing a visual indication of whether the selection of the corresponding identifier for the type of pattern piece is correct.

In some embodiments, displaying controls for different types of transformation operations includes displaying schematic depictions of the transformation operations. In some embodiments, the displaying of identifiers of different types of pattern pieces and the displaying of the one or more identifiers for numbers of pattern pieces to cut is in response to receiving the selection of the visual representation of the pattern piece. In some embodiments, the displaying of controls for different types of transformation operations is in response to the selection of at least one of the multiple pattern pieces. In some embodiments, the transformation operations include rotate, reflect, and copy.

In some embodiments, the method also includes: displaying a login interface to the user; and receiving information regarding a username and a password from the user.

In some embodiments, the method also includes: accessing information regarding a mobile address of the computing device and storing the accessed information regarding the mobile address and information associating the mobile address with a user.

In some embodiments, the method also includes storing information regarding the users' completion of each module associated with information identifying the user.

In some embodiments, the method also includes recording information regarding correct and incorrect selections by the user, regarding correct and incorrect positioning of pattern pieces on the visual representation of the material, regarding correct and incorrect movements of pattern pieces onto the visual representation of the material, and/or regarding correct and in movements of pattern pieces onto the visual representations of the three-dimensional model.

In some embodiments, the method also includes transmitting information to the user via the computing device after completion of one or more modules. In some embodiments, the information transmitted is based, at least in part, on one or more scores of the user's performance during one or more of the learning modules.

In some embodiments, the method also includes providing graphical indicators of successful completion of one or more modules within a training session and during one or more prior training sessions.

In some embodiments, the method is implemented as a web-based application on the computing device that is hosted by a remote server.

In some embodiments, at least some of the user selections are received via a touch screen interface of the computing device.

An embodiment includes a system for collaborative refining of digital and/or physical garment prototypes. The system includes: a database of a plurality of apparel computer aided design (CAD)-based models; and an application accessed via a computing device and communicatively coupled to the database. The application is configured to: receive information identifying a first selected apparel CAD-based model of the plurality of apparel CAD-based models; display a graphical representation of the first selected apparel CAD-based model; modify a view of the graphical representation of the first selected apparel CAD-based model based on user input received via a user interface of the computing device; display annotation tools for annotation of the first selected apparel CAD-based model and receive input for annotation from a user via the annotation tools or via speech processed via a natural language processing tool; and display an indication of the annotation on the display of the graphical representation of the identified apparel CAD-based model.

In some embodiments, the application is further configured to: store the annotation input associated with the first selected CAD-based modal in the database and store a time that the input for annotation was received or a time that the annotation input was stored; receive from a user, an identification of a file to be uploaded, associated with the first selected apparel CAD-based model; and store the identified file associated with the first selected apparel CAD-based model in the database.

In some embodiments, the application is further configured to provide a notification to one or more additional users regarding a change in or an addition to the stored information associated with the first selected apparel CAD-based model in the database.

In some embodiments the system also includes the application executing on a second computing device. The application executing on the second computing device is configured to: receive information identifying the first selected apparel CAD-based model; and display a graphical representation of the first selected apparel CAD-based model including an indication of the annotation.

In some embodiments, where the second computing device has a default language preference different than a language of the annotation input, the application executing on the second computing device is further configured to display the annotation input in the default language of the second computing device.

In some embodiments, the application executing on the second computing device is further configured to: receive a second annotation input from a user of the second computing device; and store the second annotation input associated with the first selected CAD-based modal in the database.

In some embodiments, the information identifying a first selected apparel CAD-based model of the plurality of apparel CAD-based models obtained from image data acquired from an imaging device of the computing device.

In some embodiments, the application is further configured to: display information regarding the identified first selected apparel CAD-based model; and request confirmation of the selection of the identified first selected apparel CAD-based model.

In some embodiments, the application is further configured to guide a user through a fit session for the identified first selected apparel CAD-based model.

In some embodiments, guiding the user through the fit session for the identified first selected apparel CAD-based model includes: displaying a request for one or more photos of a garment corresponding to the first selected apparel CAD-based model on a fit model and enabling the user to select one or more photos for upload or displaying one or more previously uploaded photos of the garment on a fit model.

In some embodiments, guiding the user through the fit session for the identified first selected apparel CAD-based model includes: for each of a plurality of points of measure: providing a graphical description of the point of measure; receiving an audio input from a user regarding the point of measure; and displaying a numerical value corresponding to the user's audio input for the point of measure and graphical indicators for acceptance or rejection of the numerical value.

In some embodiments, guiding the user through the fit session for the identified first selected apparel CAD-based model includes: for each of the plurality of points of measure: displaying a graphical indication of whether the accepted numerical value corresponding to the user's audio input for the point of measure is within tolerance for the model.

In some embodiments, guiding the user through the fit session for the identified first selected apparel CAD-based model includes: displaying a prompt for the user to provide audio comments regarding the fit; and receiving audio input from the user regarding the fit and displaying comment text corresponding to the audio input, the audio input converted to text via natural language processing relying on a garment-specific corpus of language.

In some embodiments, guiding the user through the fit session for the identified first selected apparel CAD-based model includes: displaying comments of other users regarding the apparel CAD-based model or the fit.

In some embodiments, the application is implemented as a web-based application on the computing device that is hosted by a remote server.

Some embodiments include methods implemented by the systems described herein.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE DRAWINGS

To assist those of skill in the art in making and using a system for apparel design, apparel information architecture, and associated methods, reference is made to the accompanying figures. The accompanying figures, which are incorporated in and constitute a part of this specification, illustrate one or more embodiments of the present invention and, together with the description, help to explain the present disclosure. Illustrative embodiments are shown by way of example in the accompanying drawings and should not be considered as limiting. In the figures:

The following detailed description, given by way of example, but not intended to limit the invention solely to the specific embodiments described, may best be understood in conjunction with the accompanying drawings.

FIG. 6A is a screenshot of a module for identification of pattern piece type and an interface for recording speech corresponding to the identified pattern piece type in the gamified training application, in accordance with some embodiments.

FIG. 6B is a screenshot of a setup for cutting module for identification of pattern piece type and selection of a number of pieces to cut in the gamified training application in accordance with some embodiments.

FIG. 6C is screenshot of a creation of markers for layout module for marking the pattern pieces for layout in the gamified training application in accordance with some embodiments.

FIG. 6D is screenshot of the creation of markers for layout module illustrating a rotation transformation and movement of a pattern piece, in accordance with some embodiments.

FIG. 6E is screenshot of a digital assembly module for assembling material pieces corresponding to the pattern pieces for a first garment on a three dimensional digital model or avatar, in accordance with some embodiments.

FIG. 6F is screenshot of a digital assembly module for assembling material pieces corresponding to the pattern pieces on a three dimensional digital model or avatar for a second garment, in accordance with some embodiments.

FIG. 8A illustrates a screen shot of the collaboration application displaying options for entering information for identification of a new sample in accordance with an exemplary embodiment.

FIG. 8B illustrates obtaining information for identification of a new sample via an imaging device of a computing device (e.g., a mobile phone) in accordance with an exemplary embodiment.

FIG. 8C illustrates a screen shot requesting confirmation of the identification of the new sample in accordance with an exemplary embodiment.

FIG. 8D illustrates a screen shot of a display including options for entering additional information regarding the identified new sample in accordance with an exemplary embodiment.

FIG. 8E illustrates a screen shot of a user interface for uploading photos of the identified sample in accordance with an exemplary embodiment.

FIG. 8F illustrates a screen shot of a user interface for scheduling a fit date for the sample in accordance with an exemplary embodiment.

FIG. 8G illustrates a screen shot of a user interface displaying information regarding the identified sample, the scheduled fit date and other relevant design deadlines associated with the sample in accordance with some embodiments.

FIG. 8H illustrates a screen shot of a user interface enabling the user to select custom points of measurement (POM), which may be saved in the application for the user, or standard points of measurement, which may be standard for the type of garment, for the fit in accordance with some embodiments.

FIG. 8I illustrates a screen shot of a user interface prompting the user to dictate a value for the displayed POM in accordance with some embodiments.

FIG. 8J illustrates a screen shot of a user interface displaying a value corresponding to the dictated value for the point of measurement and requesting confirmation that the displayed value corresponds to the dictated value in accordance with some embodiments.

FIG. 8K illustrates a screen shot of a user interface displaying a schematic graphical depiction of the point of measurement, the confirmed value of the measurement, and whether the confirmed value is within tolerance, and requesting confirmation that the confirmed value is correct for the point of measurement in accordance with some embodiments.

FIG. 8L illustrates a screen shot of a user interface displaying entered values for the points of measurement and displaying a control button to submit the entered values for the points of measurement to be recorded in a database in accordance with some embodiments.

FIG. 9A illustrates a screen shot of a user interface of the application for selection of a garment in accordance with some embodiments.

FIG. 9B illustrates a screen shot of a user interface of the application for selection of a type of information to be provided or displayed for the selected garment in accordance with some embodiments.

FIG. 9C illustrates a screen shot of a user interface of the application for uploading and characterization of photos of the garment in accordance with some embodiments.

FIG. 9D illustrates a screen shot of a user interface of the application for viewing photos of the garment by type of view in accordance with some embodiments.

FIG. 9E illustrates a screen shot of a user interface of the application for providing comments and viewing comments of others in accordance with some embodiments.

FIG. 9F illustrates a screen shot of an individual comment received via speech in accordance with some embodiments.

FIG. 9G illustrates a screen shot of a summary or checklist of comments for review in accordance with some embodiments.

FIG. 9H illustrates a screen shot of a list of garments for selection and tracking of garments that have already been reviewed and addressed in accordance with some embodiments.

DETAILED DESCRIPTION OF THE INVENTION

Figure 1:
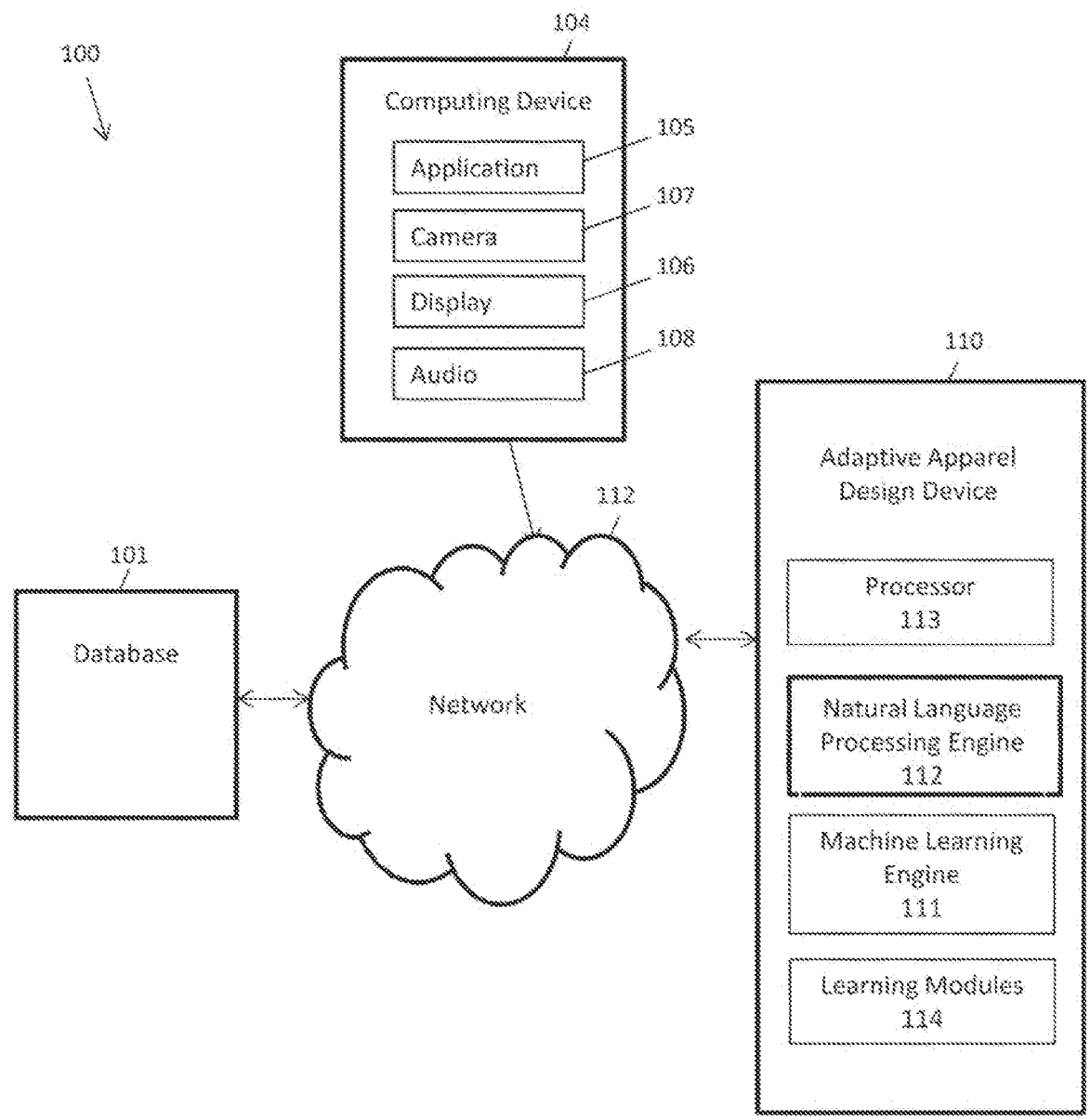
FIG. 1 illustrates an exemplary network for adaptive apparel design and apparel information architecture, in accordance with an exemplary embodiment.

Disclosed herein are methods and systems that can facilitate efficient and effective communication of design intent through into apparel design and manufacturing.

Apparel brand design teams, patternmakers, and production coordinators can benefit from automation in the form of 3-dimensional (3D) design algorithms. Incorporating these algorithms as part of the workflow lessens the costly product development cycles with physical sampling from factories. This assists in assessing the initial fit of a garment, experiment with trim placement, and visualizing what a material or print would look like.

A major barrier to 3D technology adoption in design departments is limited bandwidth for prep work that needs to be performed. Tasks, such as labeling digital pattern files and entering data that describes materials, trims, and stitches, are difficult. This set-up prep work or pre-work is necessary for implementation of many of these new technologies, but the pre-work is often an overwhelming addition to an already full plate.

The skills needed to do this set-up work include knowledge of garment construction, strengths, and limitations of certain sewing machines, different stitches, tension settings, and identification of pattern pieces. Sewing machine operators have this knowledge, but many do not have the technological skills and language skills to provide digital set-up services to apparel brands.

A digital platform designed especially for sewing machine operators, in accordance with some embodiments described herein, can overcome literacy and language barriers and enable workers to reskill in the face of growing automation in garment construction and to, in turn, enable manufacturers in emerging economies to unlock new service businesses when manufacturing jobs leave due to automation.

The described methods and systems enable and facilitate a transition to automated agile apparel manufacturing. The described methods and systems assist workers in gaining digital skills that allow them to transition into higher-skilled work in the factories or to move into other sectors. In some embodiments, the described methods and systems incorporate innovative cloud applications that drive efficiency and clear communication of design intent. In further embodiments, the described methods and systems incorporate a platform utilizing artificial intelligence (AI) to build on knowledge and performance over time. The described methods and systems utilize data that can be used to generate 3D blocks faster, speed up product development cycles, and bring more engineering and feasibility analysis into the design process. Furthermore, some embodiments can be used to train workers to set up datasets and processes that will yield multi-purpose digital models, which may drive brand continuity and feeling as well as speedy production across the chain.

Two pilot tests of the described training application (referenced as "Upskill") were conducted in Dhaka, Bangladesh, to determine whether garment workers in Bangladesh could effectively use Shimmy Upskill and to identify how the software could be tailored to them. These tests were conducted with the support of three local factories. The workers who participated in those pilots are referred to herein as a first group and a second group. The first group included 5 female employees, including 3 sewing operators, 1 overlock machine operator, and 1 quality assurance checker. The second group included 6 female employees including 4 sewing operators and 2 quality assurance checkers. Each pilot followed the same structure. Most of the participants (10 out of 11) did not own smartphones with touchscreen capability. Most of the participants (10 out of 11) had never used a computer. Despite their inexperience with these devices, all testers completed the four training modules within the allotted four-hour timeframe. All of the participants were comfortable with the first two modules, which tested them on pattern identification and cutting. On the other hand, many participants found the last module on digital assembly difficult to complete. The result of the pilot revealed that symbols, visualizations, and touch screens are key to addressing users' limited digital literacy. Upskill achieved its goal of creating a gamified learning tool. In addition to teaching digital skills, the software also helped users learn other languages and the apparel production process.

FIG. 1 illustrates an exemplary network for adaptive apparel design and apparel information architecture 100, in accordance with an exemplary embodiment. The system 100 includes at least one database 101, an application 105, and an adaptive apparel design computing device 110 with a processor 113 executing at least a machine learning engine 111, a natural language processing engine 112, and learning modules 114. The learning modules may include a setup for cutting module, a creation of markers for layout module, a digital assembly module, and a pattern piece identification module. In some embodiments, the adaptive apparel design computing device 110 may further include automation technology applications. The processor 113 may act as a server, for example, a web server or an application server. Although the database 101 is shown as remote from the computing device 110, in alternative embodiments, the at least one database 101 can exist within the computing device 110. Although the machine learning engine 111 is shown as included in the adaptive apparel design device 110, in some embodiments, at least some of or all of the machine learning engine 111 may be implemented in a separate device or system in communication with the adaptive apparel design device. Although the natural language processing engine 112 is shown as included in the adaptive apparel design device 110, in some embodiments, at least some of or all of the natural language processing engine 112 may be implemented in a separate device or system in communication with the adaptive apparel design device 110.

In some embodiments, the application 105 or "app" executes on a computing device 104 for users such as apparel technical designers. The application 105 may be a desktop application, a mobile application, and/or a web-based application. The computing device 104 may be, for example, a smartphone, a tablet, a desktop or laptop computer, or some other type of electronic device equipped with a display 106, a camera 107, and audio equipment 108. It will be appreciated that the engines 111 and 112 may be provided as a series of executable software and/or firmware instructions.

In some embodiments, the application 105 employs voice-to-text functionality, for example, to facilitate recording sample measurements and fit notes. For example, as described below, a user of the application 105 may use voice commands, e.g., speaking a name of garment pieces in both English and a local language. The data from the application 105 is transmitted to the adaptive apparel design computing device 110. In some embodiments, the application 105 is built in Angular and hosted on IBM's Bluemix and/or Microsoft Azure.

The adaptive apparel design computing device 110 turns unstructured patterns into coded digital elements that can be easily recalled, configured, and run through machine learning engine 111.

As the user inputs data into the application 105, the application 105 transmits the data to the adaptive apparel design computing device 110 that may analyze and/or save the data, as described herein. For example, the adaptive apparel design computing device 110 may save voice recordings and responses in the database 101. In some embodiments, the database 101 may be a Firebase database. The adaptive apparel design computing device 110 may further collect correlative data from the application 105 with the aim to enable future versions of the software to help fashion brands and manufacturers speed up design and production and improve product quality.

In some embodiments, the adaptive apparel design computing device 110 is configured to enable a user to efficiently label, code, and generate digital files ready for 3D design (e.g., digital stitching, etc.). In some embodiments, the application 105 and the adaptive apparel design computing device 110 are designed to accommodate users that are not English speakers, who have limited English-language skills, or that have varying literacy levels, by displaying vocabulary in English and a local language as well as using symbols when possible. For example, the application 105 uses translation to help with learning English and conducting learning activities, such as translating custom sewing instructions for workers with other languages than that used in the in-country factory.

In an exemplary embodiment, the application 105 is configured to train garment production workers on digital pattern making, rudimentary 3D modeling, and alternative transferable skills, as further described below. The adaptive apparel design computing device 110 may utilize natural language processing (via natural language processing engine 112) in order to expand into multiple countries/territories where garment manufacturers are located (e.g., Bangladesh, Cambodia, Vietnam, Indonesia, Sri Lanka, etc.).

The adaptive apparel design computing device 110 communicates, via a communications network 112, with the application 105. The communications network 112 can be any network over which information can be transmitted between devices communicatively coupled to the network. For example, the communication network 112 can be the Internet, an Intranet, virtual private network (VPN), wide area network (WAN), local area network (LAN), and the like.

In some embodiments, the adaptive apparel design computing device 110 and/or the application 105 incorporate automation technology applications. In some embodiments, these applications are cloud-based. In some embodiments, the applications are cloud-based with some local data collection in case of unstable or unreliable internet connection. In some embodiments, the applications at least partially cloud based. Non-limiting examples of such automation technology applications are mobile and web-based based applications for scanning, photography, voice transcription, and Bluetooth-enabled measurement to automate the process of processing, fitting, and analyzing physical garments in professional and commercial situations, speech-to-text capturing, and photo and depth sensing data capturing.

The adaptive apparel design computing device 110 and/or the application 105 may further incorporate shape recognition software to link patterns and shapes detected in physical garments. For example, if the garment has wearable technology affixed to, sewn, or woven in, the shape recognition software reads data from garment sensor, RFID, and other data collection tools to inform new design iterations.

Figure 2:
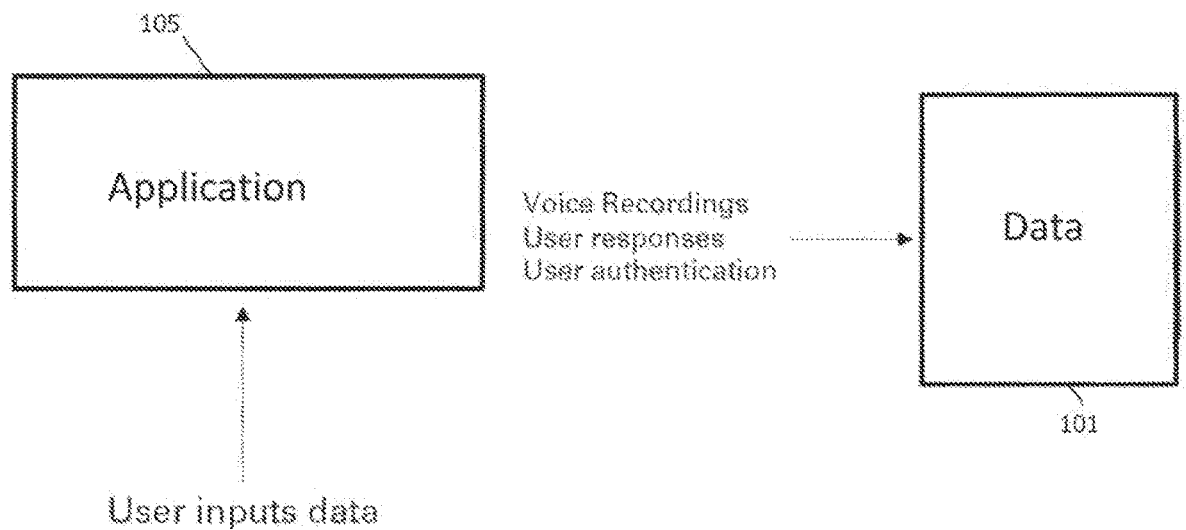
FIG. 2 illustrates user input data entered into the database via an application, in accordance with an exemplary embodiment.

FIG. 2 illustrates user input data entered into the database (e.g., database 101), in accordance with an exemplary embodiment. For example, a user enters input via user interface(s) displayed on an application (e.g., application 105). The input may include, for example, voice recordings, user responses, and user authentication. The application saves the input in the database (e.g., database 101), either directly or through a computing device (e.g., adaptive apparel design computing device 110).

Figure 3:
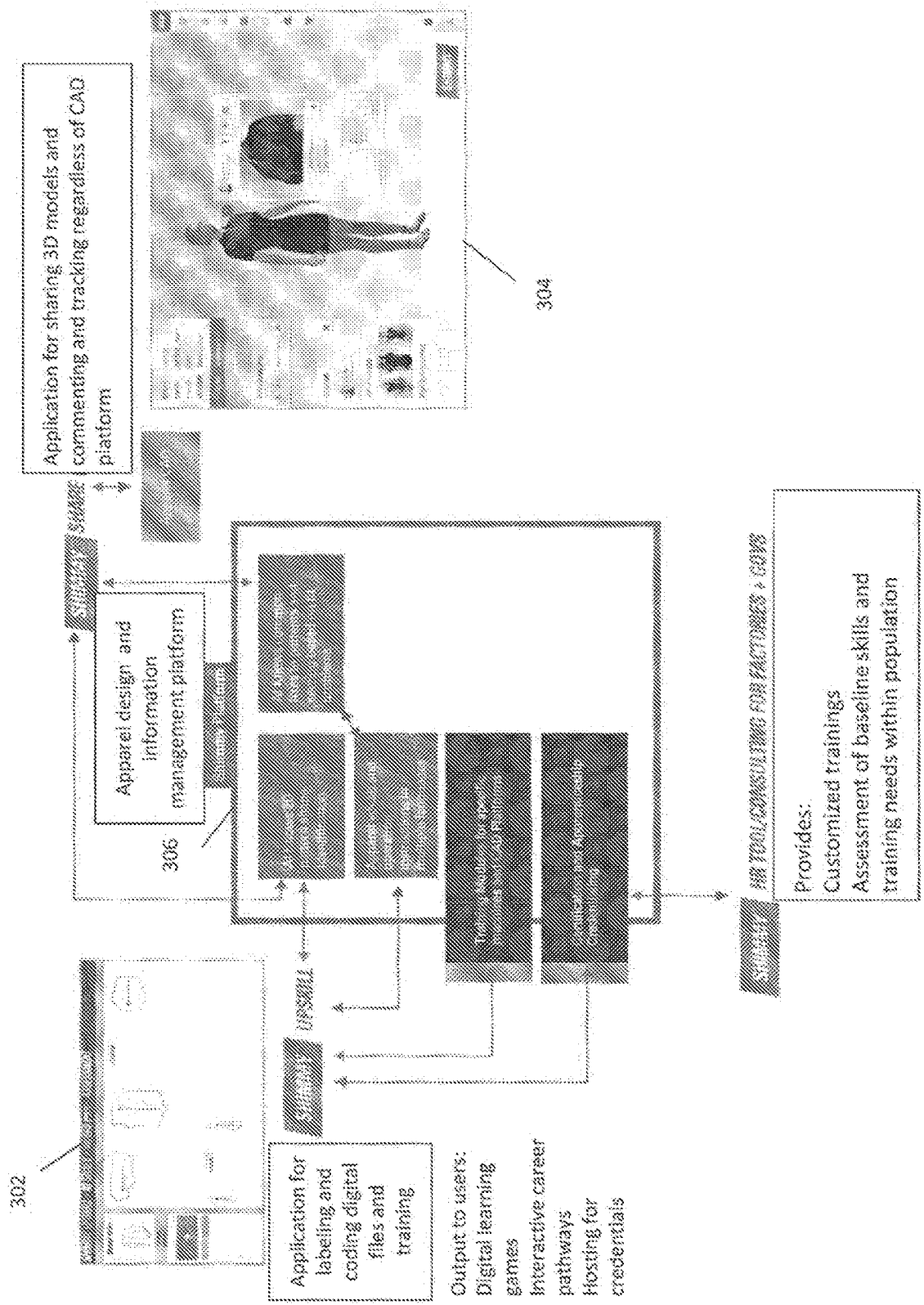
FIG. 3 illustrates a high level overview of the adaptive apparel design and apparel information system, in accordance with an exemplary embodiment.

FIG. 3 illustrates a high level overview of the adaptive apparel design and apparel information system, in accordance with an exemplary embodiment. The application 302 further described in FIGS. 6A-6F (also referenced as "Shimmy Upskill") provides a digital learning game to users. The application 304 further described in FIGS. 7A-7D (also referenced as "Shimmy Share") provides a platform to share 3D models and obtain user comments regardless of a particular computer aided design platform. Both applications 302 and 304 communicate with a central computing platform 306 (also referenced as "Shimmy Platform" and/or the adaptive apparel design computing device 110). The platform 306, for example, provides artificial intelligence to identify 2-D shapes and common fixes to patterns and sewing based on fit problems, apparel vocabulary, operation instructions in multiple languages, training modules for specific machines and CAD platforms, and certification and apprenticeship credentialing.

Figure 4:
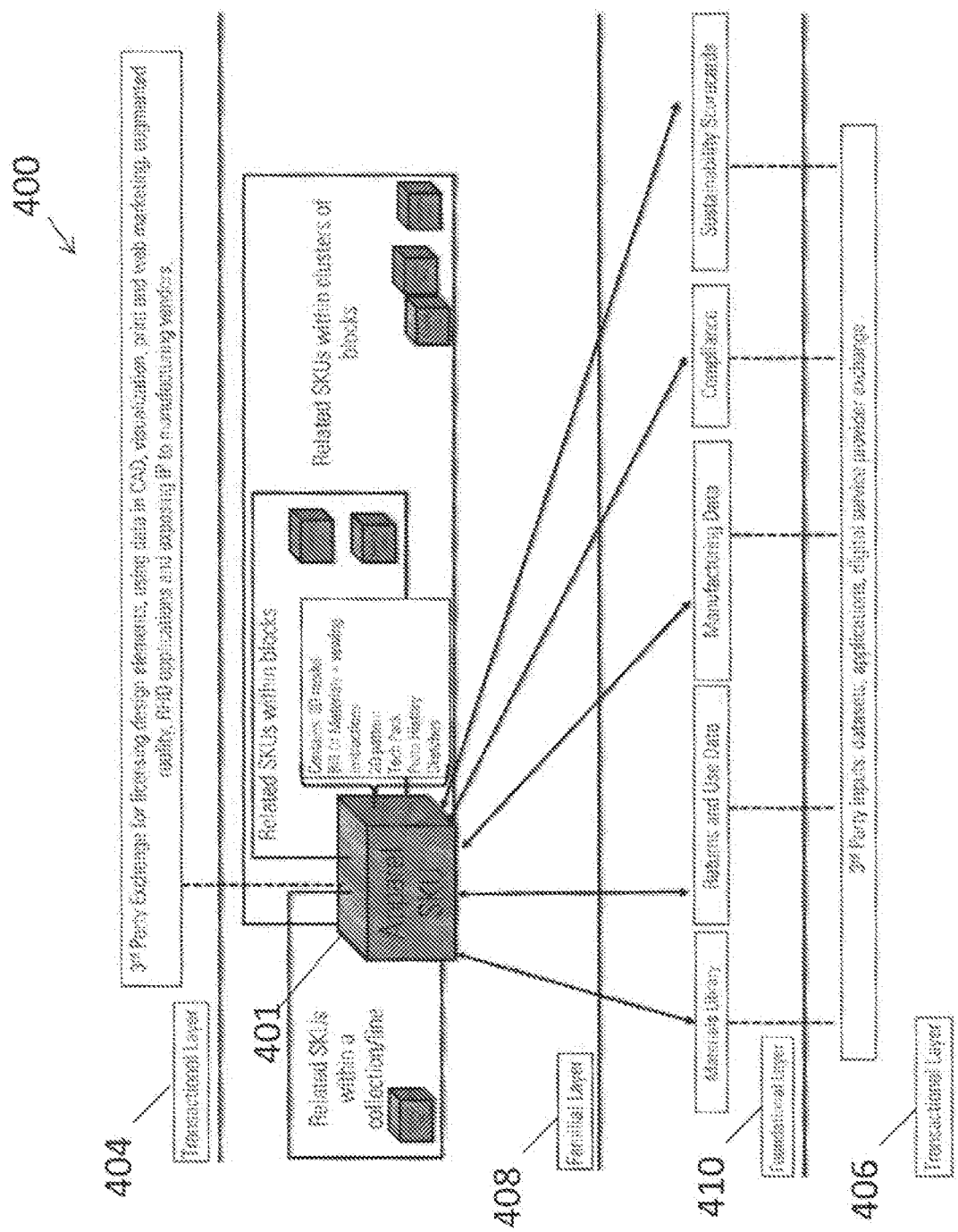
FIG. 4 illustrates the interaction of the apparel information architecture with different aspects and steps in the apparel design process, in accordance with an exemplary embodiment.

FIG. 4 illustrates the interaction of the apparel information architecture 400 with different aspects and steps in the apparel design process, in accordance with an exemplary embodiment. In some embodiments, the architecture 400 may be a data management platform. The architecture 400 further illustrates platform layers and how the platform layers interact with SKU container(s). In some embodiments, the architecture 400 may be a cloud-based data architecture. The architecture 400 reflects data taxonomy and descriptors that enable the apparel industry to achieve greater digitalization, automation of design processes, and automated garment manufacturing.

In some embodiments, within the described data management platform are containers, known as an Apparel SKU Container 401, for data pertaining to a particular stock keeping unit (SKU) of apparel. Each container holds information such as, but not limited to one or more of: a three-dimensional (3D) model, Bill of Materials, sewing instructions, two-dimensional (2D) pattern files, a tech pack, prototype history, sketches, photographs, texted and spoken comments, and other digital artifacts that aided in the design, planning, engineering, development, marketing, manufacture, transportation, sale, use, and end-of-life reclamation of the garment.

In some embodiments, each container serves as a single point of truth for the large teams who design, develop, market, sell, and reclaim garments. These various functions need to interact with this data at different levels of complexity and for different outcomes (for example, a 3D visualization needed for augmented reality versus a technical sizing grade rule needed for batch manufacturing). In some embodiments, the container can expose slices of data in ways that benefit different users while keeping track of versions, additions, and changes while tracing ancestry back to the Apparel SKU in the event of any downstream applications of the data within the platform or outside of it via a digital watermark within the code.

In some embodiments, the container is situated on the platform amongst other containers related to it (e.g., the SKUs were sold at the same time as part of a line, they originated from design elements within a particular apparel block, and they belong to a similar product class like "skirts").

The platform layers include upper transactional layers 404, a familial layer 408, a foundational layer 410, and a lower foundational layer 406.

The upper transactional layers 404 are externally facing layers where third parties can interact with the information within the apparel SKU container. The owner or controller of the apparel SKU container can limit which data is exposed and through which user interfaces and applications that the third party uses the data. The upper transactional layer 404 enables third parties to utilize product data, at the owner's discretion, to visualize it, market it, or build from it in a new design.

The lower transaction layer 406 allows third parties to supply data, digital services (e.g., 3D modeling, material science, digital simulations), and applications that are interoperable with this platform.

The familial layer 408 holds the SKU containers themselves and allows for recall, correlation between them, and data visualization.

The foundational layer 410 includes architecture that enables outside and inside datasets to pass into the platform and for that information to be represented within a particular apparel SKU container. The architecture forms the basis for multi-parameter decision-making and computational problem solving within 2D, 3D, and manufacturing and merchandizing planning software.

Some embodiments incorporate automation technology applications. In some embodiments, these applications are at least partially cloud based. In some embodiments, these applications interact with apparel SKU containers. Non-limiting examples of such automation technology applications are mobile and web-based based applications using scanning, photography, voice transcription, and Bluetooth-enabled measurement to at least partially automate the process of processing, fitting, and analyzing physical garments in professional and commercial situations (e.g., a front-end apparel sample measurement application). Non-limiting examples of tasks accomplished through automation technology applications and the platform technology are speech-to-text capturing, and photo and depth sensing data capturing.

Some embodiments further incorporate cloud-based application(s) that utilizes shape recognition software to link patterns and shapes detected in physical garments with Apparel SKU containers on the platform or accessed via the 3rd party exchange within the transactional layer 404/406. The cloud-based application analyzes user wear patterns through to grade rules within the Apparel SKU container. If the garment has wearable technology affixed to, sewn, or woven in, the application will read data from garment sensor, RFID, and other data collection tools to inform new design iterations. The cloud-based application routes end-customer return and fit impressions back from retailers, e-commerce shipping processors, and online comments through to the Apparel SKU Container and its related blocks and styles for grading adjustments.

The cloud-based application may further include a computational design engine that solves for optimal construction based on multiple parameters like cost, manufacturability, sustainability, and fit.

Figure 5:
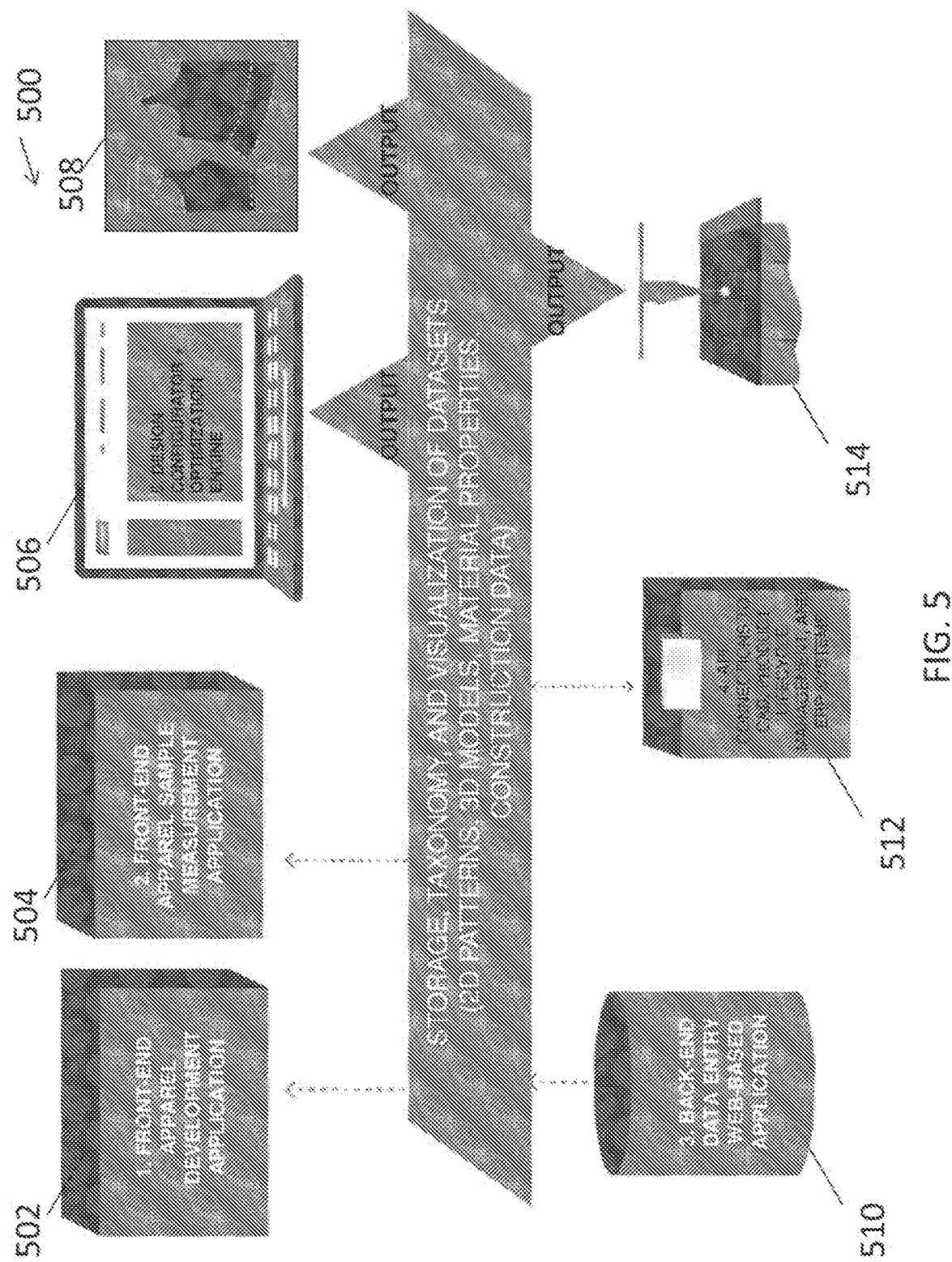
FIG. 5 illustrates components that may be included in a data management platform of the described methods and systems, in accordance with an exemplary embodiment.

FIG. 5 illustrates components that may be included in a data management platform 500 of the described methods and systems, in accordance with an exemplary embodiment.

The data management platform 500 includes a front-end apparel development application 502. The application 502 may be used, for example, for speech to text capturing, and photo and depth sensing data capturing during apparel development.

The data management platform 500 includes a front-end apparel sample measurement application 504. The application 504 may be used, for example, for speech to text capturing, and photo and depth sensing data capturing during apparel sample measurement.

Non-limiting examples of such applications 502 and 504 are mobile and web-based based application using scanning, photography, voice transcription, and Bluetooth-enabled measurement to automate the process of processing, fitting, and analyzing physical garments in professional and commercial situations.

The data management platform 500 includes a design configurator and optimization engine 506. The design configurator and optimization engine 506 performs shape recognition, correspondence identification, and configuration of pattern pieces.

The data management platform 500 includes generating and optimizing 2D pattern shapes for manufacturing 508.

The data management platform 500 includes a back-end data entry web-based application 510.

The data management platform 500 includes an API connection(s) 510 to CAD, product lifecycle management, and ERP systems (e.g., an interface for the adaptive apparel design computing device 110 and/or the application 105 to communicate with CAD, product lifecycle management, and Enterprise resource planning (ERP) systems. The data management platform 500 includes controllers 514. The controllers 514 may include machine tool controllers. For example, the controllers 514 may control automated fabric spreading and cutting machines (e.g., Sewbots® and other automated sewing robots).

One of ordinary skill in the art will appreciate that some embodiments may not include all components and some embodiments may not include all of the described features. Further, in some embodiments, the functionality of multiple components may be incorporated into a single component or fewer components.

FIGS. 6A-6F are screenshots of a gamified training application (e.g., application 105) that teaches digital pattern-making and 3D modeling to garment workers, in accordance with an exemplary embodiment. The application utilizes a design user interface similar to apparel industry CAD systems to upskill and reskill garment workers in factories. The application addresses a significant challenge facing the apparel industry involving a lack of digital workers to make digital models. The application trains a user in apparel vocabulary and operation instructions in English and in a native language of the user, which may be referred to herein as a local language. The application further creates garment/apparel taxonomy using specific set of definitions and builds a corpus to be used in the application.

The application is a game that is also a learning and work tool. The application assists users develop cognitive and technical skills with digital patternmaking, 3D digital sewing assemblies, automated equipment operation and maintenance, and other digital literacy skills. Some of the advantages of some embodiments of this application include one on one feedback delivered immediately with adaptive rewards and constructive feedback. In addition, goals (e.g., in the form of training milestones and/or work milestones) in a game environment are defined and easier to understand than interpreting the meaning inside a teacher or manager's verbal directive. Upskill also provides the user with the opportunity to work in groups and create collective intelligence across geographies and cultural divides.

The application may use artificial intelligence (AI) to train garment workers on basic digital patternmaking, 3D digital sewing assemblies, and other digital literacy skills like English and interface use. In some embodiments, the main features of the application include voice narration in a local language of the user (e.g., Bangla), display of video instructions in the local language, voice-to-text functionality in recalling pattern pieces, symbols, and visualization to guide users, a backend database to save responses from users, and touch-screen functionality. In some embodiments, the application trains or provides input to train an artificial intelligence platform (e.g., IBM's artificial intelligence platform, IBM Watson), to recognize an apparel vocabulary in a foreign language, such as Bangla apparel vocabulary, and align it with shapes and English words.

In some embodiments, the application is designed around Bloom's Taxonomy, a learning framework that ensures learners apply what has been learned. The model consists of six educational objectives: remember, understand, apply, analyze, evaluate, and create. The application guides users through the levels of Bloom's Taxonomy with active learning and multimedia modules focused on 3D and digital patternmaking.

The application includes voice narration in the user's local language (e.g., Bangla) to help explain module instructions. In some embodiments, the application also includes video instructions to guide users on how to work through different learning modules. In some embodiments, the voice to text functionality mentioned above is integrated into the application to aid in recalling pattern pieces.

In some embodiments, the application may be a web-based application, and a user (e.g., a garment worker) may be provided with login information so that the user can access the web-based application. The user (e.g., garment worker) logs into the application and is guided through a series of learning modules, as shown in FIG. 6A-6F. In some embodiments, the application is provided to the user via a computing device that enables touch screen input. In some embodiments, the user selects a module via a display on the touch screen and follows the instructions displayed in words and symbols. The user (e.g., garment worker) can also select a displayed option to play a recorded voice with instructions. In some embodiments, a trainer/administrator may also log into a backend of the application to create accounts, reset passwords, and look at the results data being collected by the users (e.g., garment workers) using the interface.

In one embodiment, the application includes the following modules: apparel pattern identification, setup for cutting, creation of markers, and digital assembly.

In some embodiments, the application may be a cloud-based application that utilizes shape recognition software to link patterns and shapes detected in physical garments with Apparel SKU containers on the platform or accessed via the 3rd party exchange within the transactional layer.

Figure 6A:
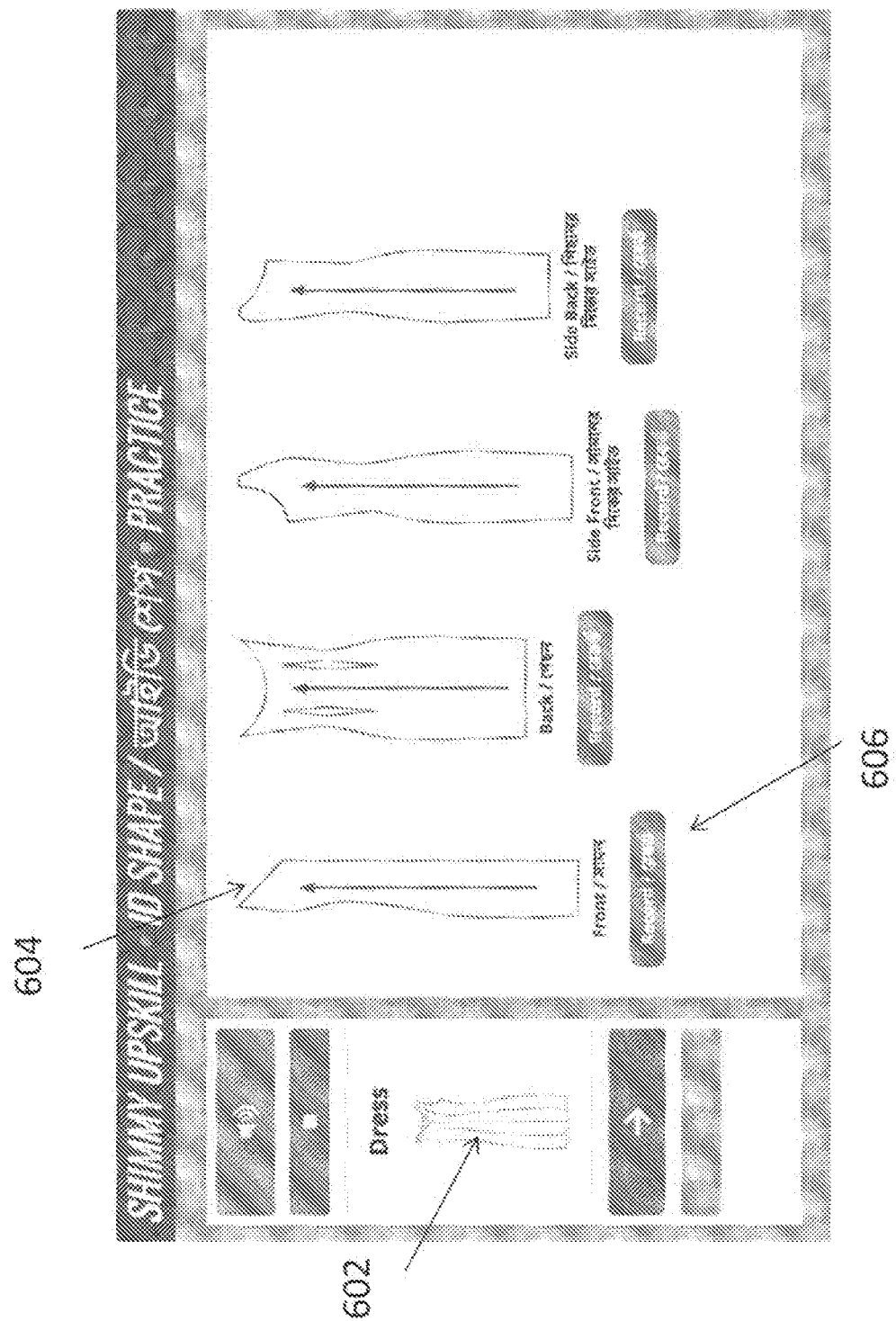
FIGS. 6A-6F are screenshots of a gamified training application that teaches digital patternmaking and 3D modeling to garment workers, in accordance with an exemplary embodiment.

FIG. 6A illustrates an interface of the application for apparel pattern identification. The user is shown a visual representation of a garment 602 (i.e., a dress shirt, dress, pants, etc.) and visual representations of types of pattern pieces 604 (e.g., shapes of pattern pieces needed to create the garment) that are included in a pattern for the garment 602 (i.e., front, back, collar band, sleeve, collar, cuff, yoke, etc.). Each type of pattern piece has an associated name that is shown in the local language, or in the local language and English. A record button 606 is associated with each type of pattern piece such that the user can record the pronunciation of the type of pattern piece in the local language, or in the local language and English. The pronunciation is stored in a database. In some embodiments, there is a visual indication when the recording has been saved (e.g., the record button 606 turns blue and/or shows ("Done") when the voice recording has been saved.) The user can use the record button 606 to record apparel vocabulary words spoken by the user. Once identification of all pieces for a pattern for a garment is completed, the user can select a button to move on to another garment to perform apparel pattern piece identification for that garment.

Figure 6B:
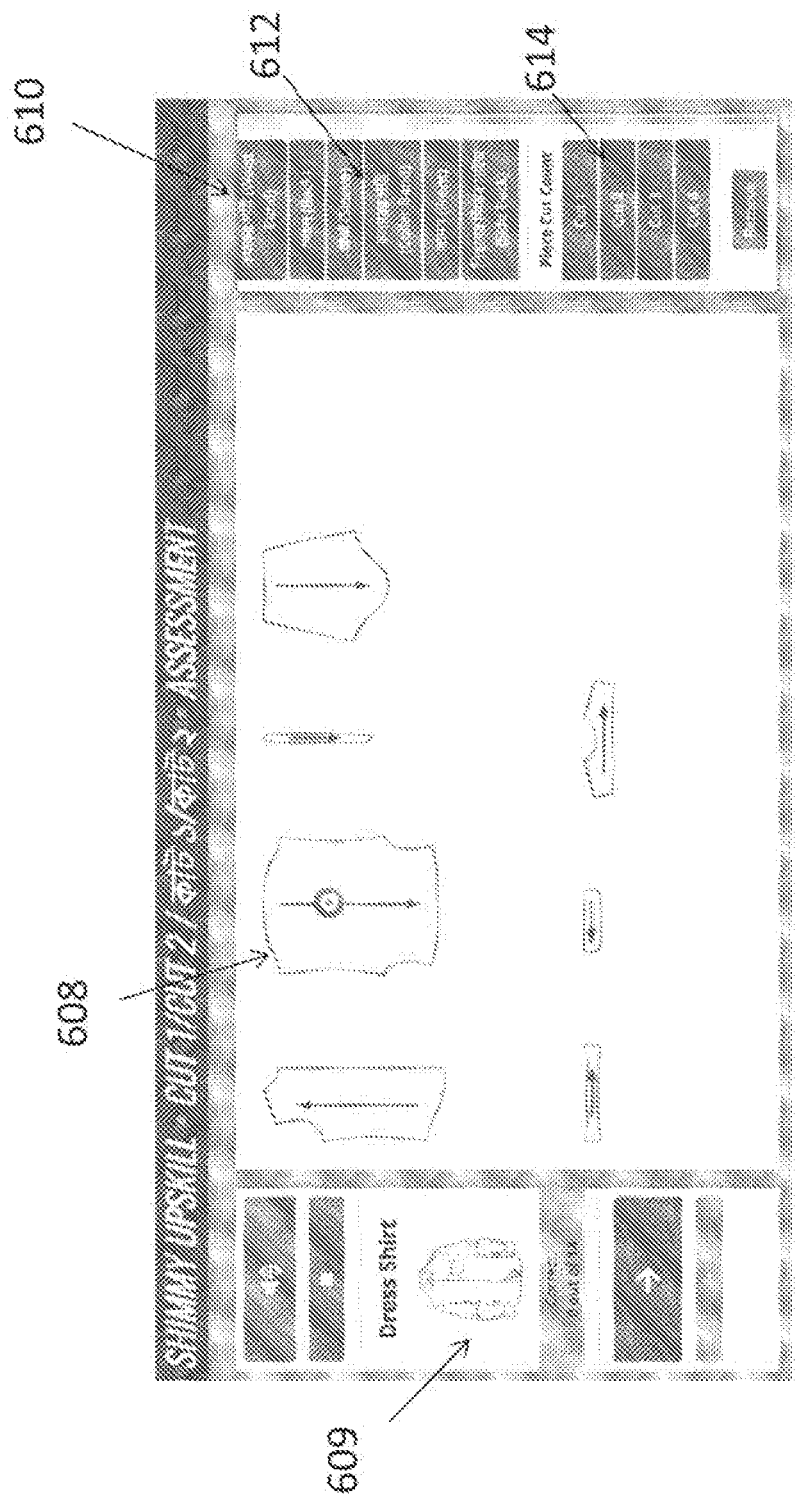

FIG. 6B illustrates an interface of the application for setup for cutting. The user is tasked with identifying the pattern pieces by name as performed in FIG. 6A. The user can also add the number of times the pattern piece is used to make a complete garment. The user can do this by voice or by touching the screen.

The user selects or clicks on a pattern piece 608 for a garment 609, which populates a sidebar or column 610 with potential names 612 of the pattern piece 608 and a potential number of times 614 the pattern piece 608 is used to make the garment 609. The user must user choose the correct name, which is also referred to as type, of the pattern piece 608 from the potential names (potential types) in the sidebar 610 and the number of times 614 the pattern piece 608 is used to make the garment 609 (for example, it may require cutting two sleeve pattern pieces to make the garment). The names may be presented in English and/or the local language (e.g., Bahasa and/or Bahasa Indonesian).

The user performs the above actions for all the presented pattern pieces and identifies the type of pieces from the column 610. In some embodiments, the user is assessed based on the number of correct answers. Once done, the user can select a button to move on to another garment to perform a setup for cutting for that garment.

In some embodiments, information regarding the performance of a user or of multiple users of the application may be provided to a supervisor, administrator, or employer via an analytics interface to get baseline skills assessment and training data/results. Employers may achieve a sustainable workforce by training factory workers, who will then transition to higher skilled, higher paying jobs and grow more dedicated to their company.

Figure 6C:
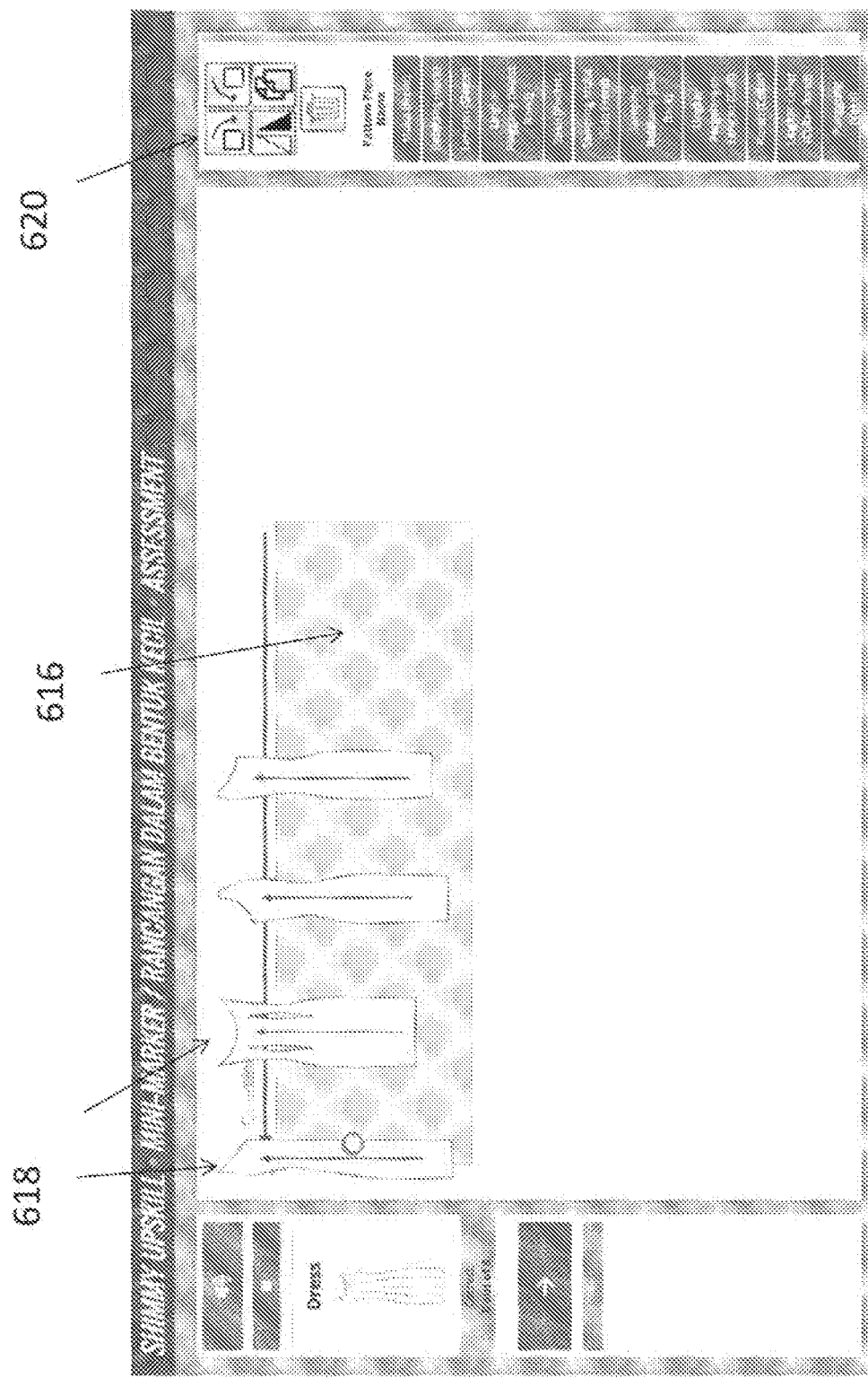

FIG. 6C illustrates an interface of the application for creation of markers. A plan for cutting the garment in the fabric is called a marker or a layout. Before any cutting begins, the marker is used to determine how much fabric is being used per garment. This calculation is called consumption and is tied to the cost of the garment. In the interface, the user creates a marker for cutting the pattern pieces out of the fabric. The user places pattern pieces on the cloth (represented by a grey rectangle 616) in a way that minimizes waste. The user selects the pattern pieces 618 to relocate on the grey rectangle 616) in a way that minimizes waste. The user can rotate, flip, and copy each pattern piece 618 by clicking the buttons 620 on the top right hand corner.

Figure 6D:
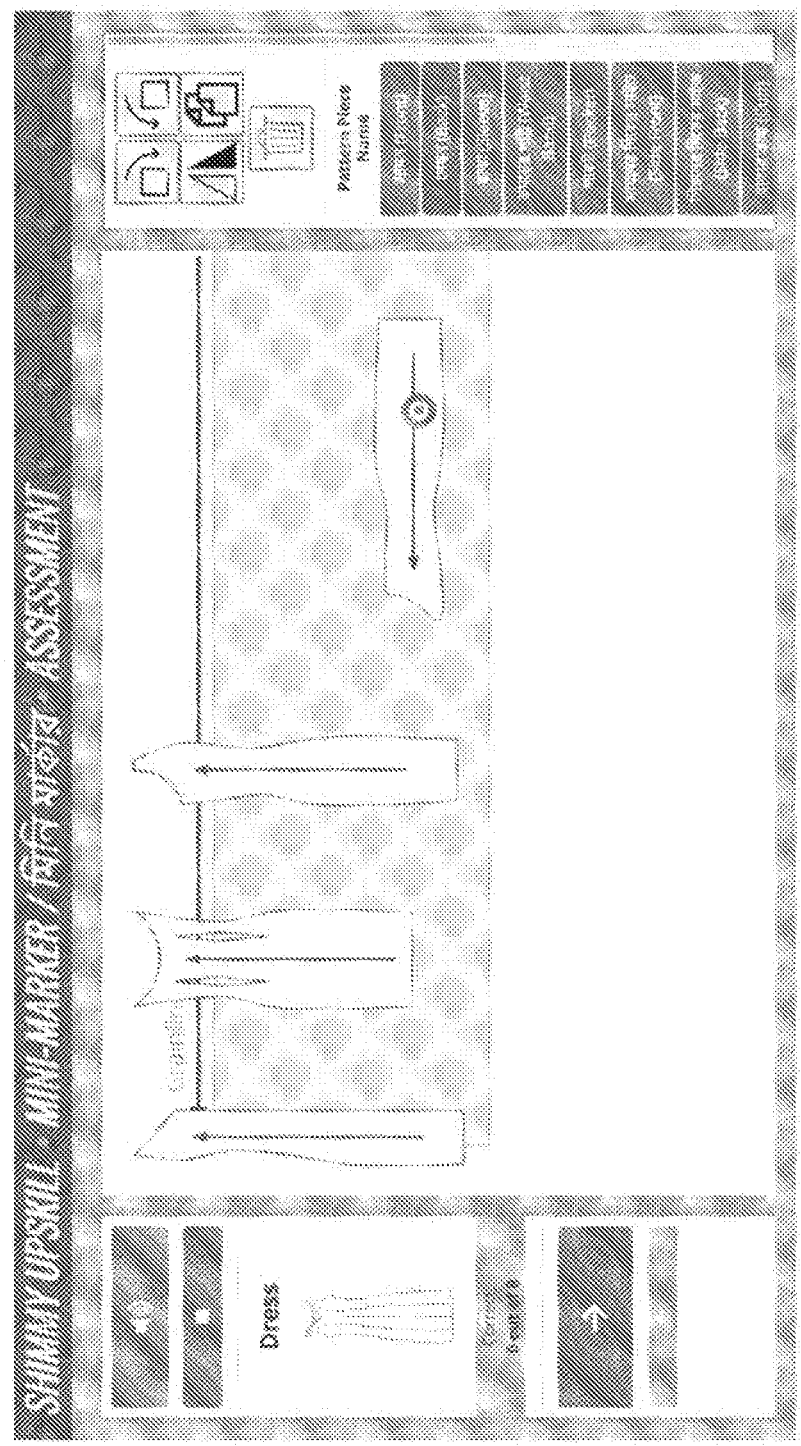

FIG. 6D illustrates another interface of the application for creation of markers.

Figure 6E:
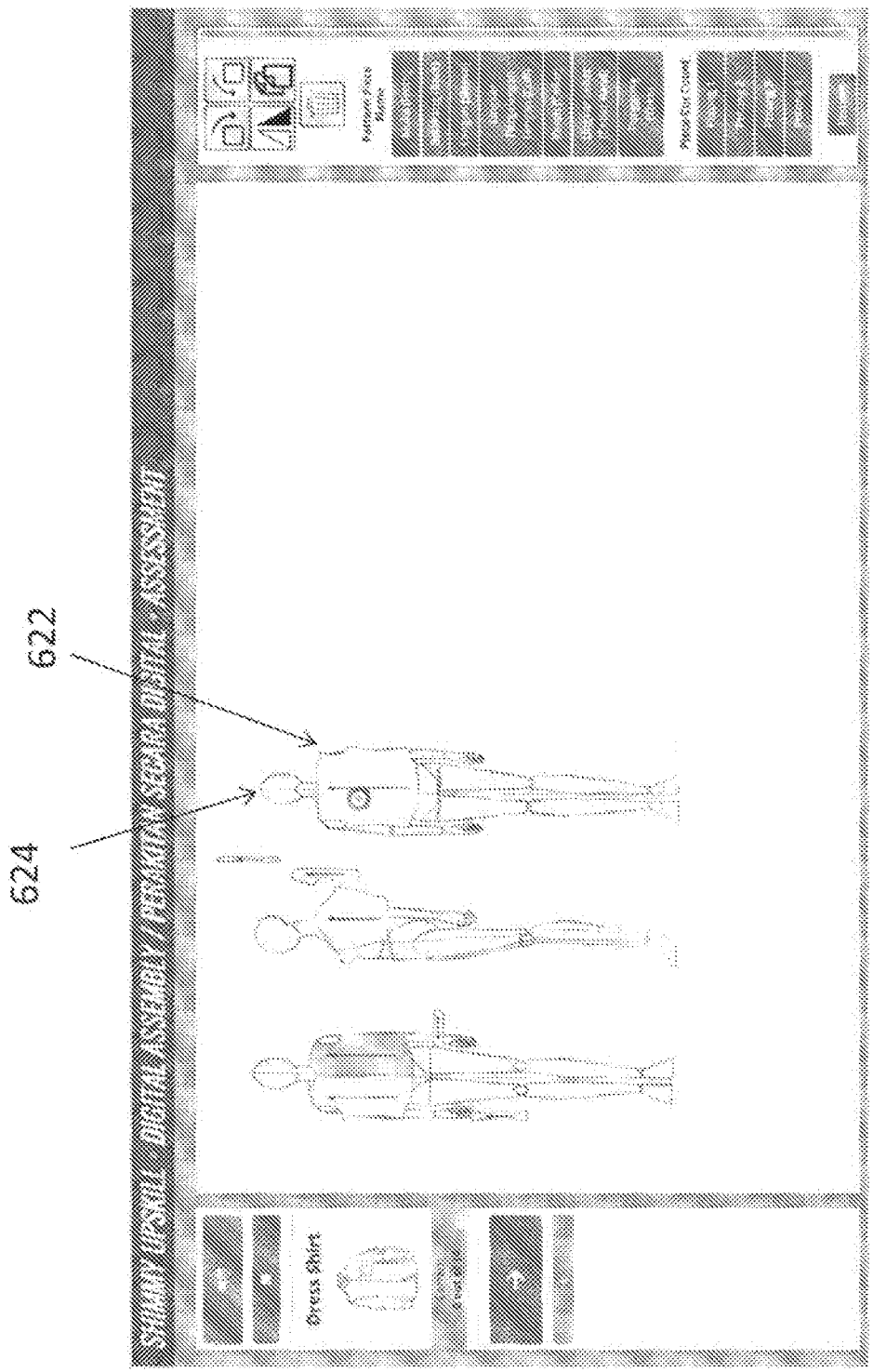

FIG. 6E illustrates an interface of the application for digital assembly. In the Digital Assembly module, the user lays down pattern pieces 622 on a three dimensional model or avatar 624. The user identifies the pattern pieces and the cut count. Users can also flip, rotate, and copy pieces to lay onto the avatar by clicking the buttons 620.

Figure 6F:
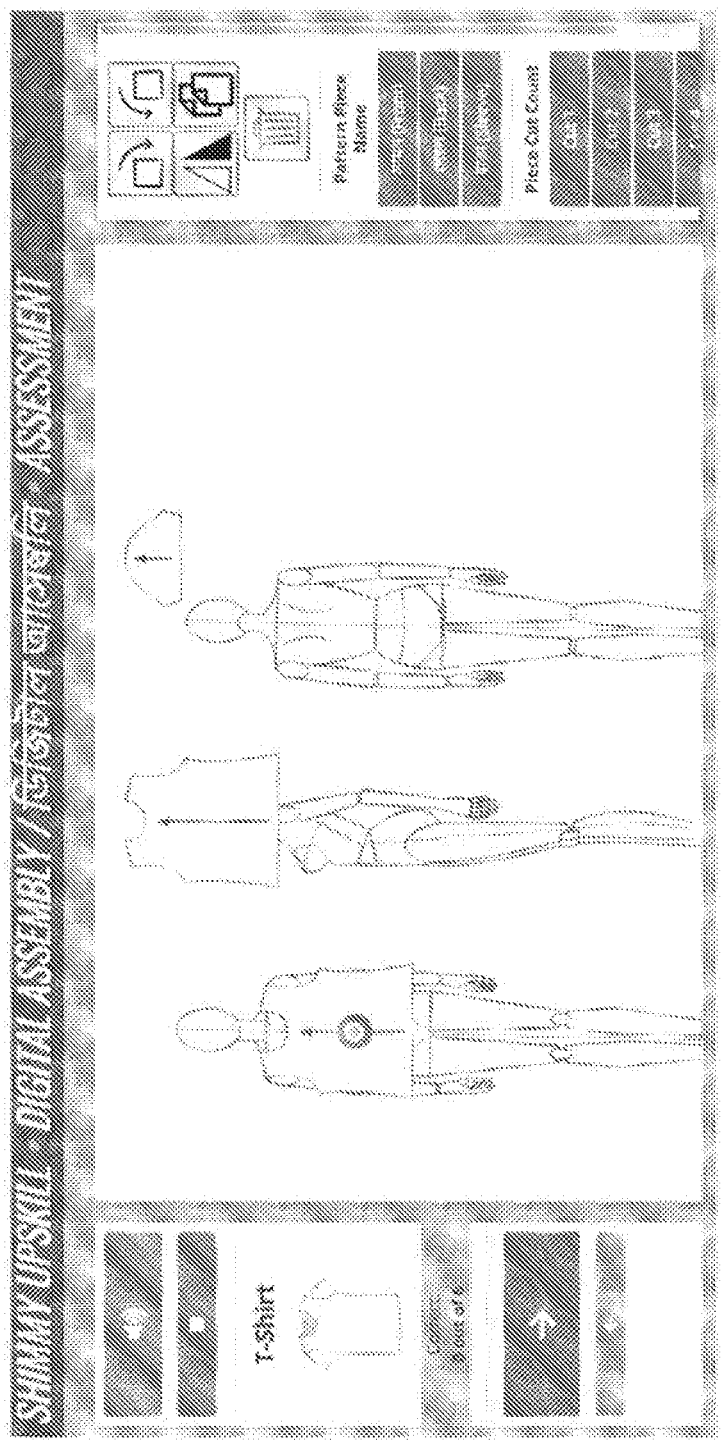

FIG. 6F illustrates another interface of the application for digital assembly.

Figure 6G:
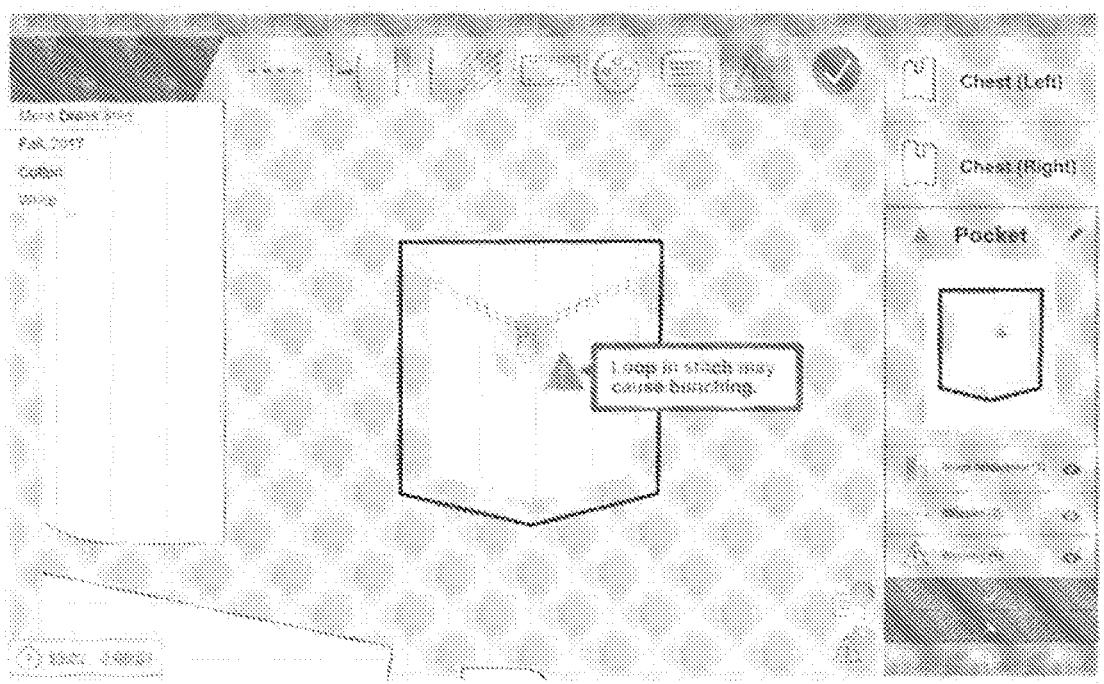
FIG. 6G is screenshot for a lesson regarding correct and incorrect tension in sewing in a gamified training application in accordance with an embodiment.
Figure 6H:
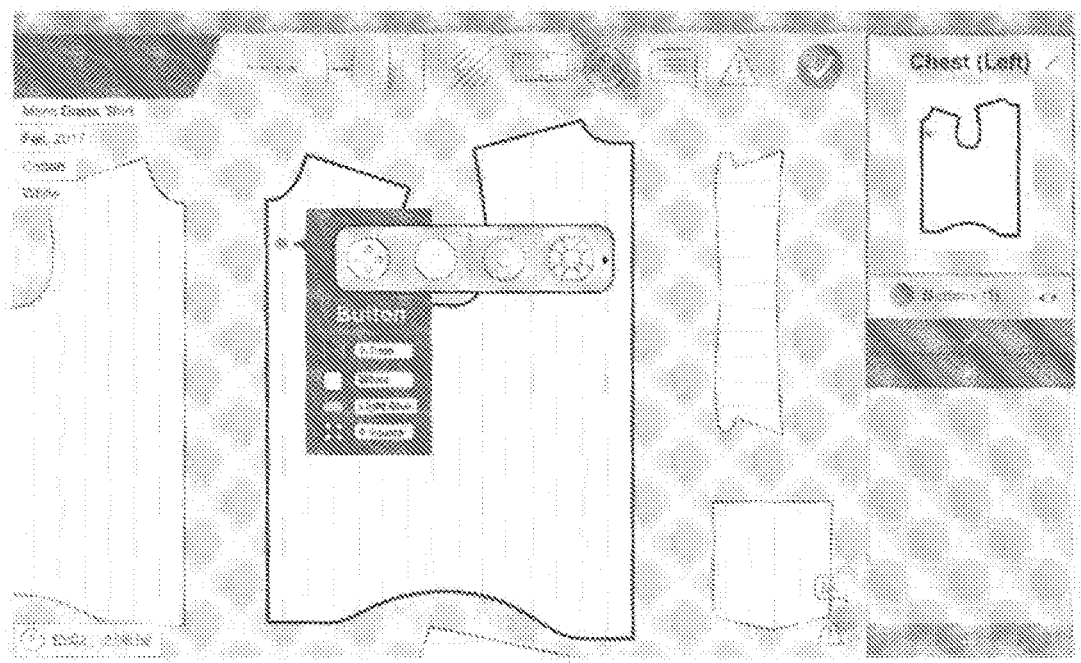
FIG. 6H is screenshot for a lesson regarding button placemen in a gamified training application in accordance with an embodiment.

FIGS. 6G and 6H illustrate another interface of an application for digital assembly, in accordance with some embodiments. FIG. 6G is an interface for a lesson regarding correct and incorrect tension in sewing in accordance with an embodiment. FIG. 6H is an interface for a lesson regarding button placement in accordance with an embodiment.

In some embodiments, the user interface prompts the user to provide login information (e.g., a user name and password). In some embodiments, the user will log in using a mobile address. In some embodiments, the application will continue to engage the user in knowledge retention, incentives for continuing study, and useful technical tips after the training session is completed, e.g., by follow up messages in the application, via email, via text, or via other messaging applications or modes. The described systems and methods can be designed so that as a user of the training and work application (e.g., a garment worker) moves through exercises and operations, input from the user can be employed to build a dataset and train an AI that is useful for automating product design and development workflows. There is a technical demand for the institutional knowledge sewing machine operators possess. Some embodiments can leverage that knowledge and build upon it though the design of back end user interfaces that facilitate future work for current sewing machine operators to use their knowledge in turning unstructured patterns into digital files ready for 3D designs.

Figure 7A:
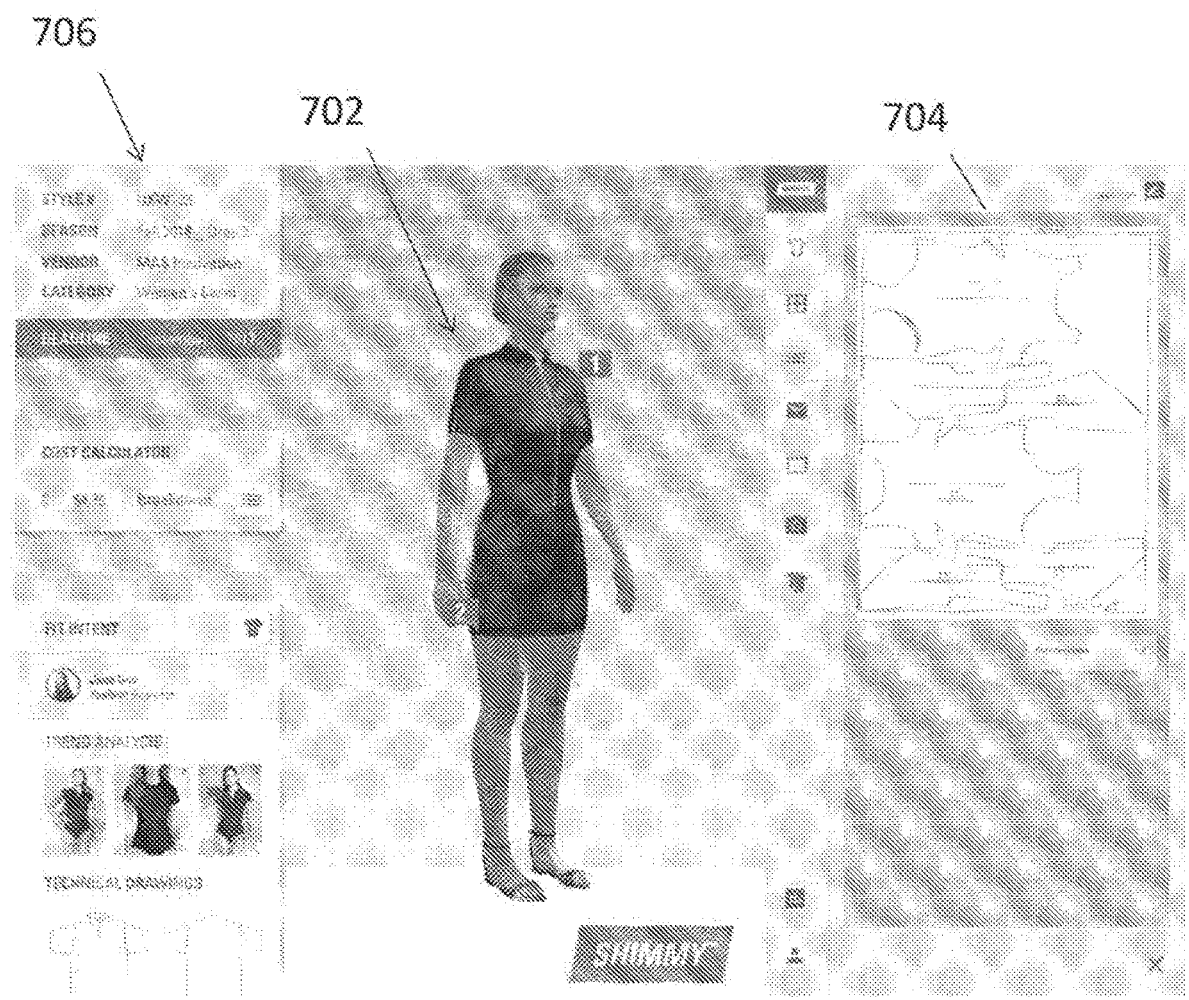
FIG. 7A is a screen shot illustrating a 3-dimensional (3D) digital model of a garment displayed on an application for collaborating and refining of digital and/or physical garment prototypes illustrating display of the digital model information and/or links to related digital assets, such as the two dimensional pattern pieces, cost information, technical drawings, material properties, in accordance with some embodiments.
Figure 7B:
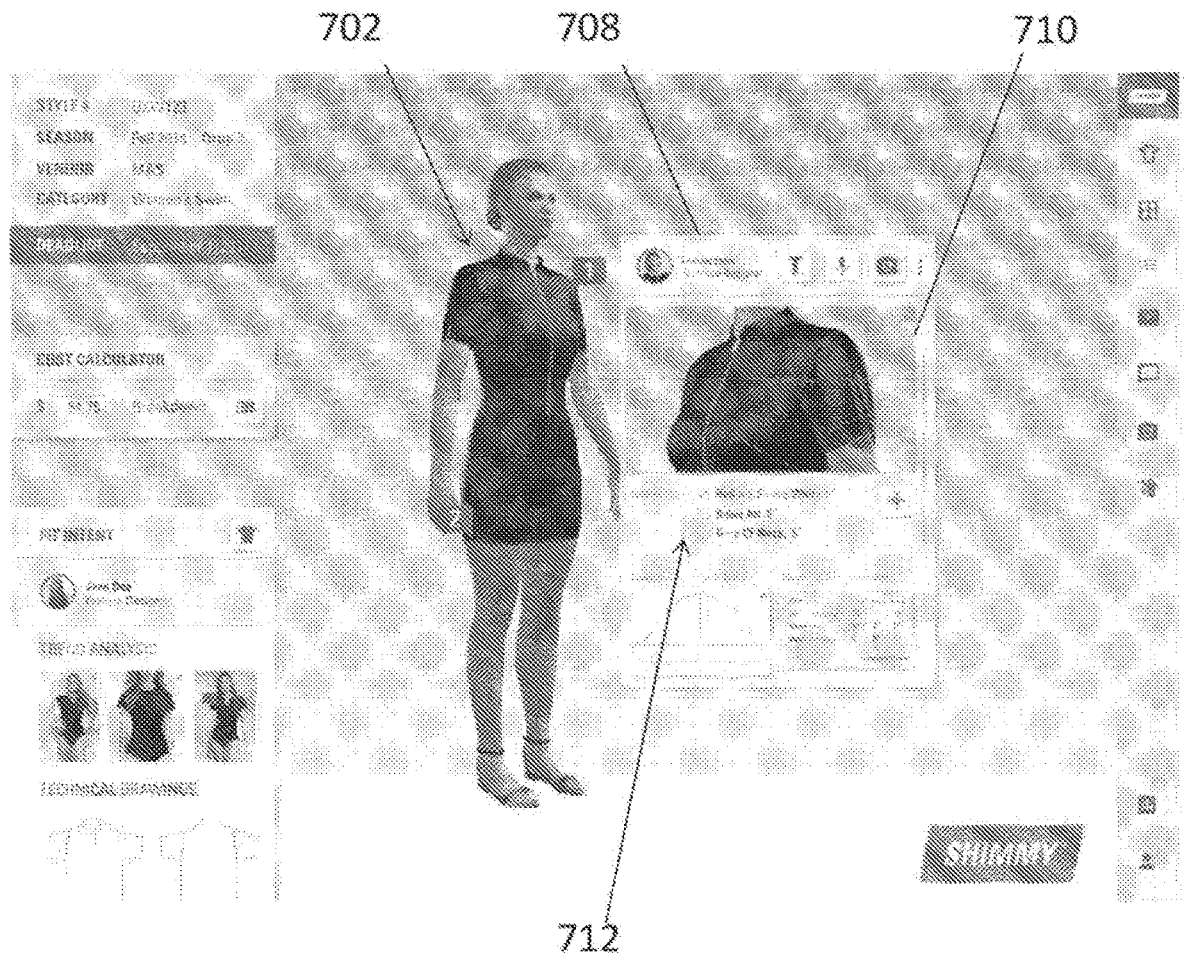
FIG. 7B is a screen shot illustrating the 3-dimensional (3D) digital model of the garment displayed on the application illustrating a localized comment associated with the digital model in accordance with some embodiments.

FIGS. 7A and 7B illustrate 3-dimensional (3D) digital model 702 of a garment displayed on an application, in accordance with an exemplary embodiment. For example, the garment may be the one of the garments designed in FIGS. 6A-6F. Pieces of material needed to create the displayed garment are shown within a section 704 associated with the digital model 702. Additional information about the displayed garment is shown within a section 706 associated with the digital model 702. FIG. 7A illustrates the interface where the digital model is being displayed with links to related digital assets, such as the two dimensional pattern pieces, cost information, technical drawings, material properties, etc.

3D digital models are used to build digital prototypes of garments so the design can be evaluated without having to sew a physical prototype. 3D digital models can further be utilized to judge the fit of a garment on a digital body to make sure the pattern was made correctly. Apparel brands, manufacturers, and retailers in remote locations can also view and make decisions about the design without having to ship a physical prototype. 3D digital models can also be used to assist a consumer of clothing to view the garment as a 360-degree digital model on a website or in an AR/VR consumer experience. The described systems and methods can assist in building the capacity of garment workers to create digital models to enable these use cases over time. 3D design will increase time-to-market by building a common language that allows brands and manufacturers to reduce physical prototypes and design errors.

The application (e.g., application 105) is web-based collaboration application that assists in the process of refining digital and physical garment prototypes. In an exemplary embodiment, the application is a web-based 3D viewer, accessible from laptop, tablets, or a phone, that can consume a digital model 702 built in an apparel CAD program and display it for easy viewing, manipulation, and annotation. Utilizing the viewer, the digital model 702 can be spun 360 degrees, zoomed in or out, annotated, and drawn on using a stylus or fingertip. The users can make localized comments directly on the digital model and add pictures, video, and uploads of files like Excel documents, PDFs, or Illustrator files. The comments will display as tags on the 3D model 702 as well as in a time-stamped checklist where a user can indicate that the comment has been addressed. FIG. 7B illustrates a localized comment 708 placed in association with the digital model. The comment 708 includes an uploaded picture 710. The comment 708 will display as a tag on the 3D model 702 as well as in a time-stamped checklist 712 where a user can indicate that the comment has been addressed.

The comments are automatically translated into the user's preferred language by using Natural Language Processing and a corpus with apparel vocabulary and domain expertise. The corpus, in at least some languages, may be built or obtained, at least in part, from input from users of the training/learning and work tool application.

The 3D digital model 702 is displayed in the application on a computing device (e.g., computing device 104). In some embodiments, the adaptive apparel design computing device 110 is configured to enable a user to efficiently label, code, and generate digital file(s) ready for 3D design (e.g., digital stitching, etc.). The adaptive apparel design computing device 110 transmits the digital file(s) to a web-based 3D viewer. The web-based 3D viewer displays the 3D design based on the digital file(s).

In some embodiments, the computing device may further use artificial intelligence during digital product creation and/or during testing simulation, such as generating predictions on how material is affected by certain conditions such as stretching, heat, etc., and generating predictions regarding fit problems based on size, materials, pattern design.

FIGS. 8A-8L illustrates interfaces for identifying and designing a garment, in accordance with an exemplary embodiment. In particular, as explained further below, a user enters information on a first garment sample and schedules a date and a time to try on the first garment sample.

Figure 8A:
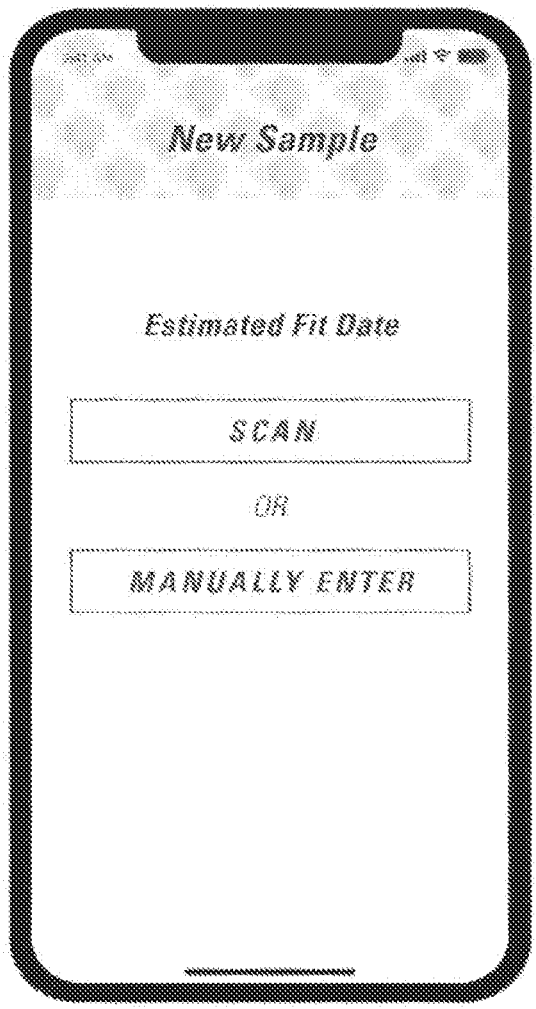
FIGS. 8A-8L illustrates interfaces for identifying and designing a garment using a collaboration application, in accordance with an exemplary embodiment.
Figure 8B:
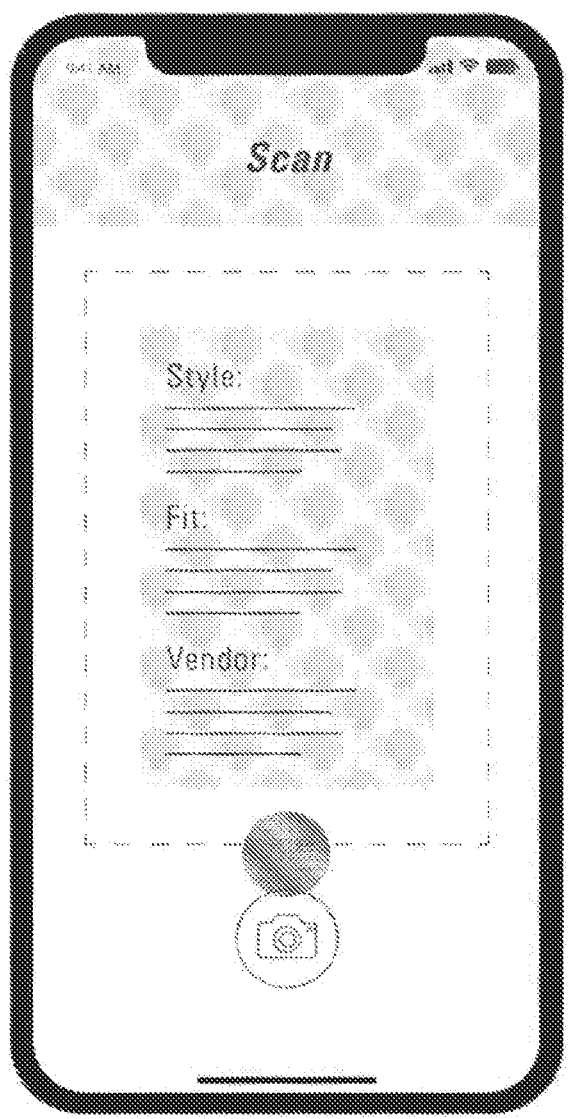
Figure 8C:
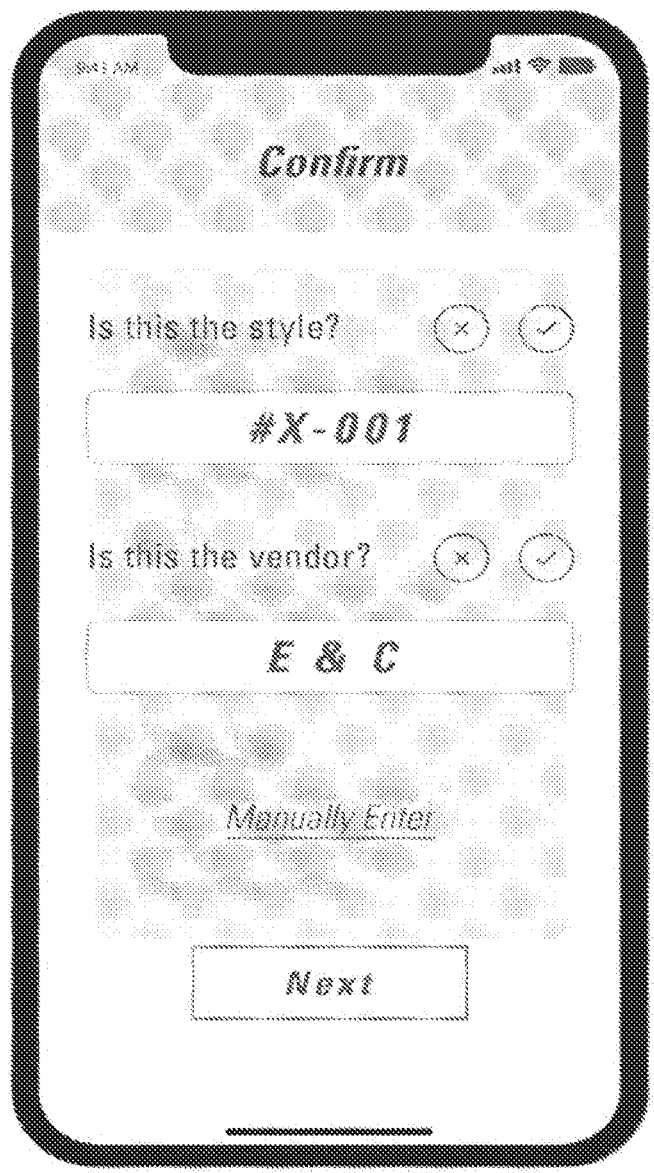
Figure 8D:
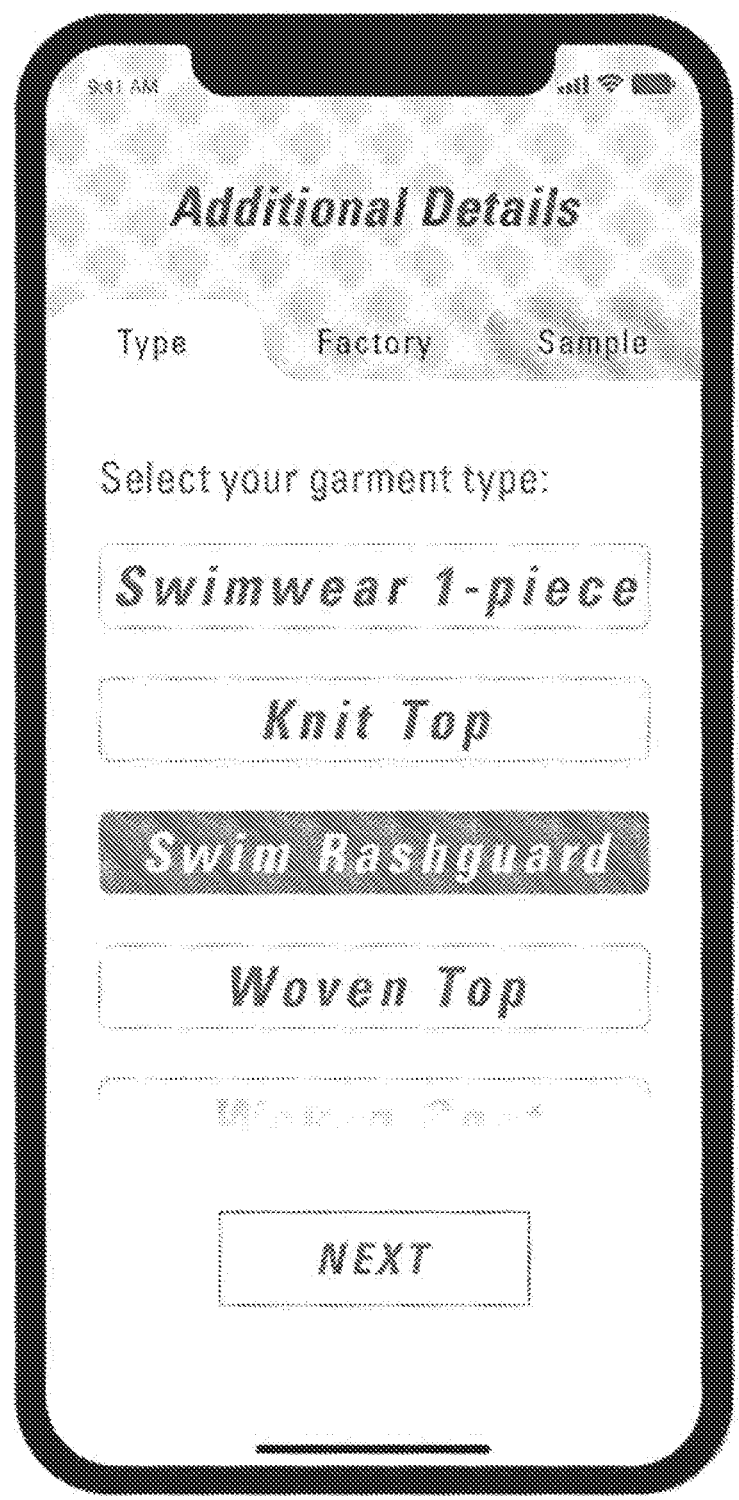
Figure 8E:
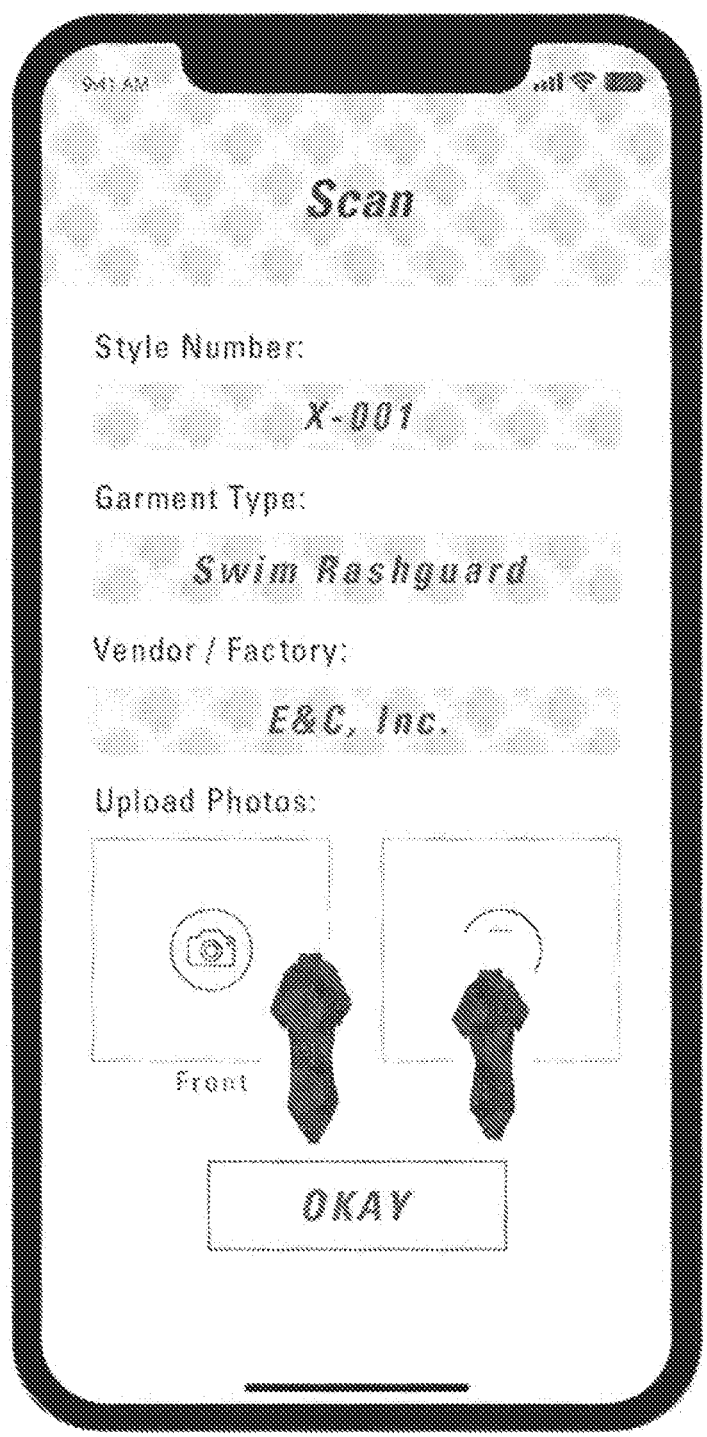

FIGS. 8A-8E illustrate interfaces on the application for entering information on a garment, for example, by scanning a garment tag or garment paperwork. The garment paperwork may include, for example, a style, a fit, and a vendor. A user may enter additional details on the garment, such as selecting the garment type, as shown in FIG. 8D.

Figure 8F:
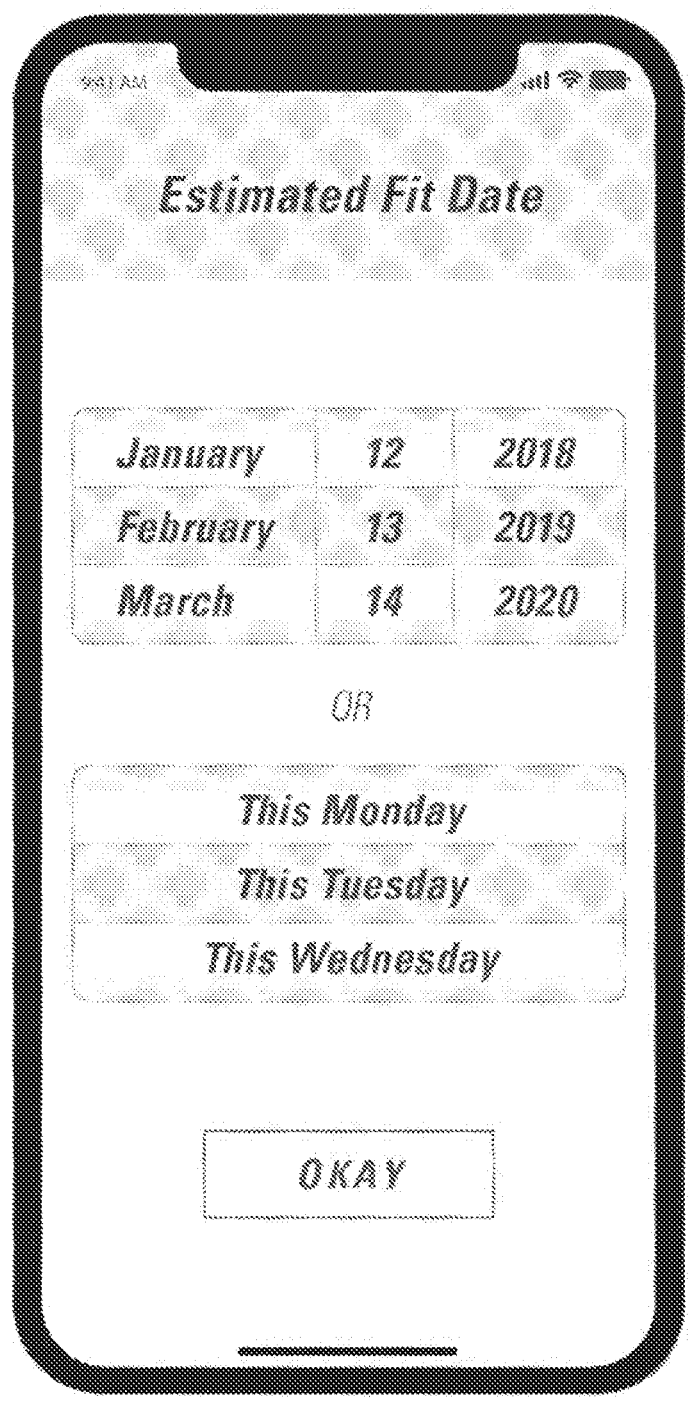

FIG. 8F illustrates an interface for selecting a fit date to try on the garment identified in FIGS. 8A-8C.

Figure 8G:
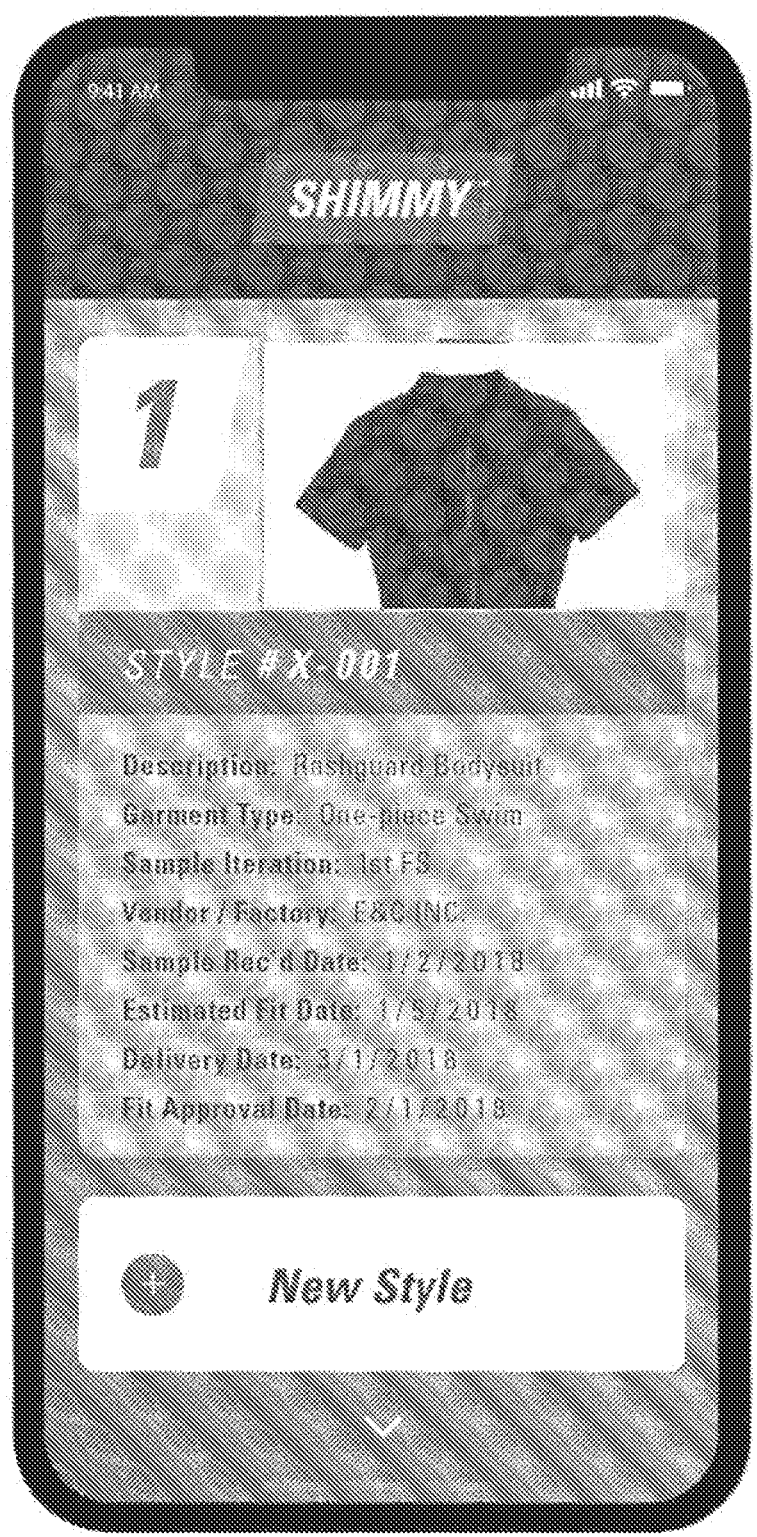
Figure 8H:
Figure 8I:
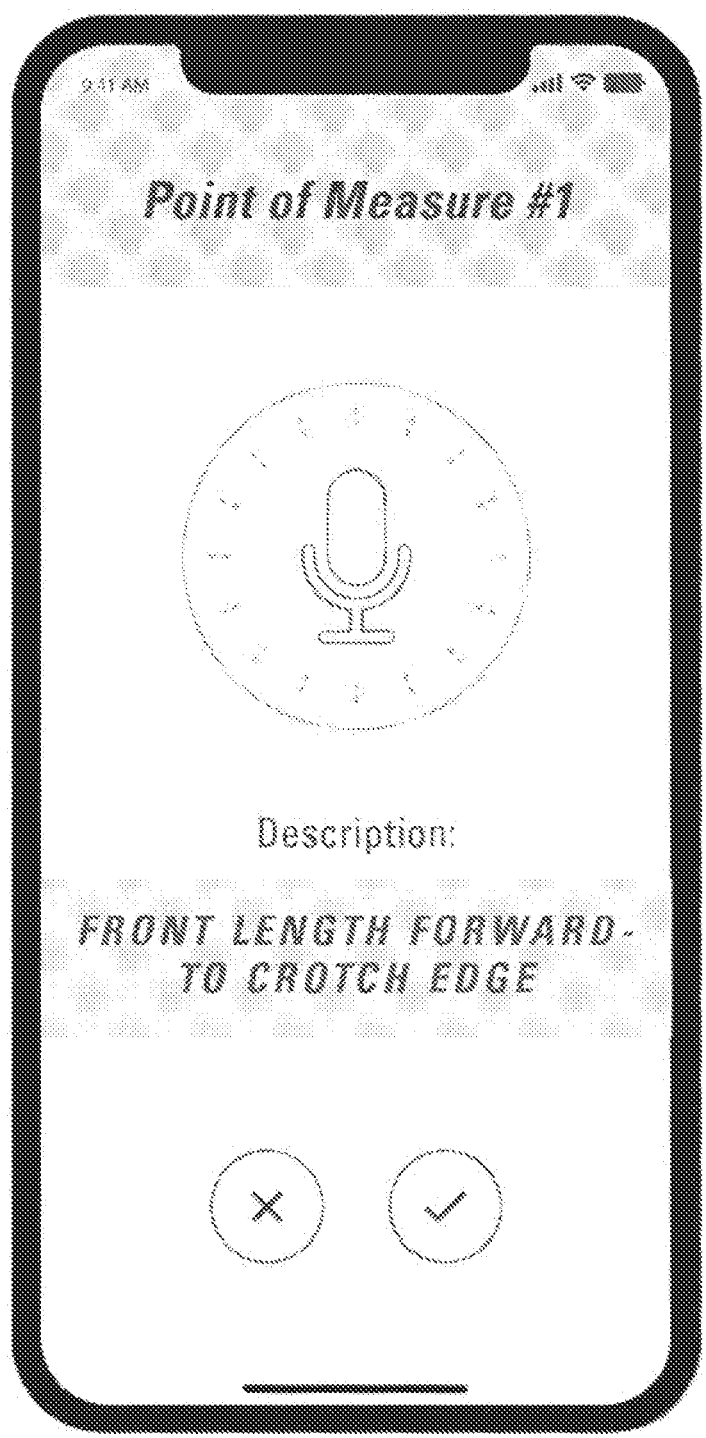
Figure 8J:
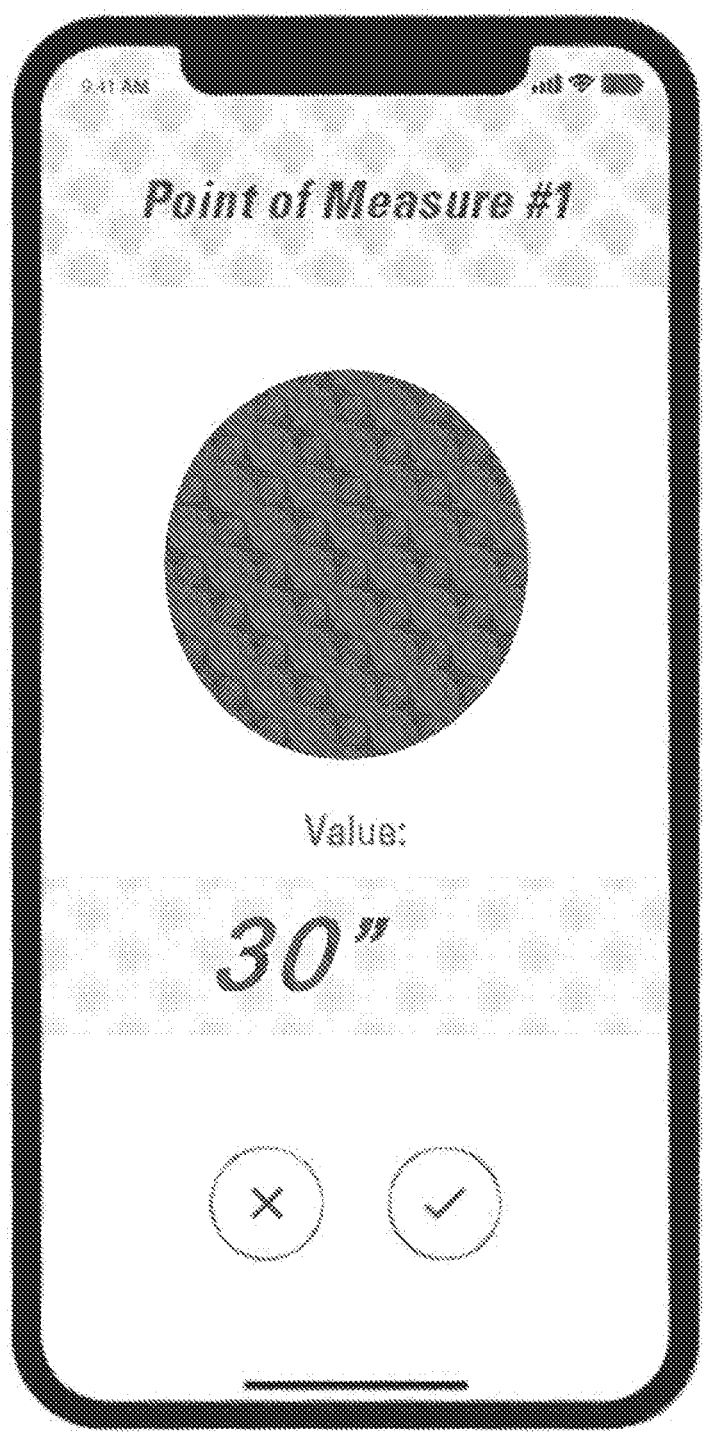
Figure 8K:

FIG. 8G illustrates an interface displaying a summary of the information from FIGS. 8A-8F. The information may include a description, garment type, sample iteration, vendor/factory, sample received date, estimated fit date, delivery date, and fit approval date.

FIGS. 8H-8K illustrate interfaces on the application for entering values for points of measurements for the garment identified in FIGS. 8A-8C. The points of measurements may be used to design the garment.

Figure 8L:

FIG. 8L illustrates an interface displaying a summary of the measurements from FIGS. 8H-8K.

FIGS. 9A-9H illustrate an interface for obtaining and incorporating feedback on the garment of FIGS. 8A-8L, in accordance with an exemplary embodiment. In particular, as explained further below, a user receives comments and/or feedback on the first garment sample, and creates a second garment sample based on the comments and feedback.

Figure 9A:
FIGS. 9A-9H illustrate an interface for obtaining and incorporating feedback provided by a collaborative application, in accordance with an exemplary embodiment
Figure 9B:
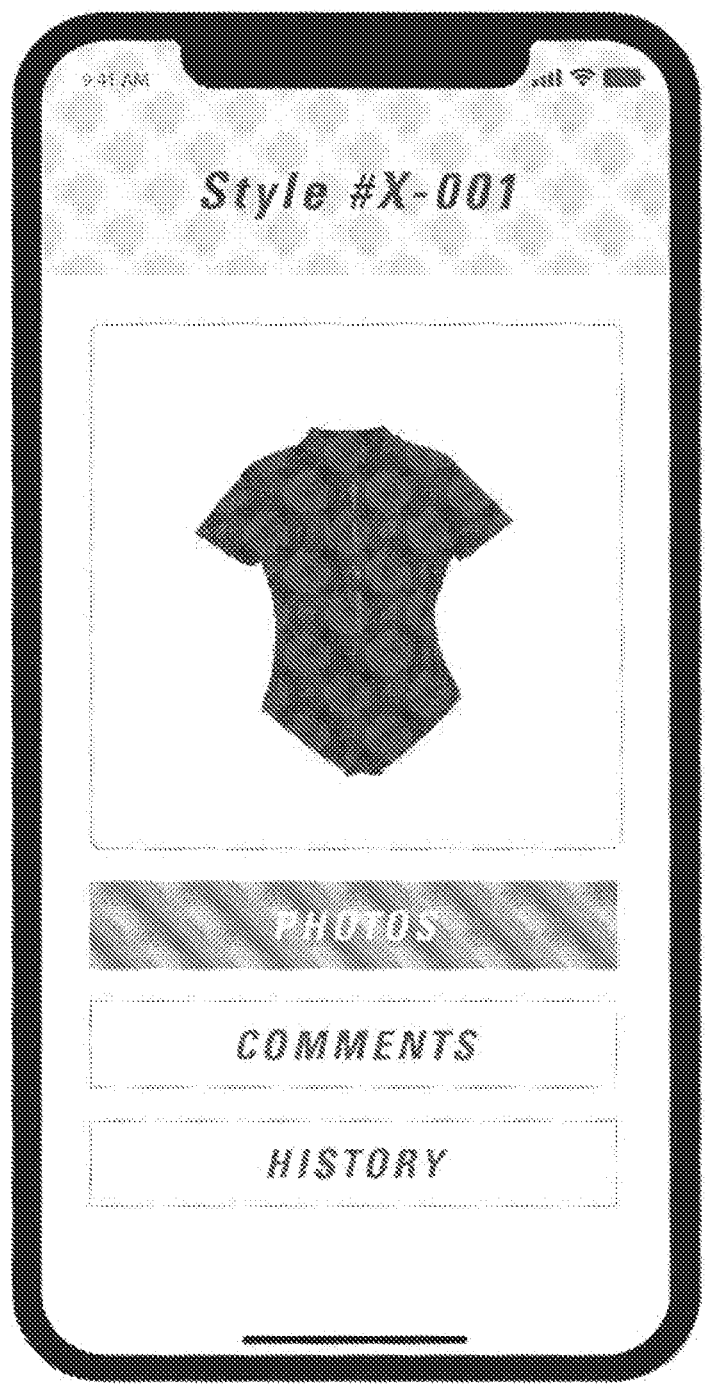

FIGS. 9A-9B illustrate an interface on the application enabling a user to selecting a garment for the fitting.

Figure 9C:
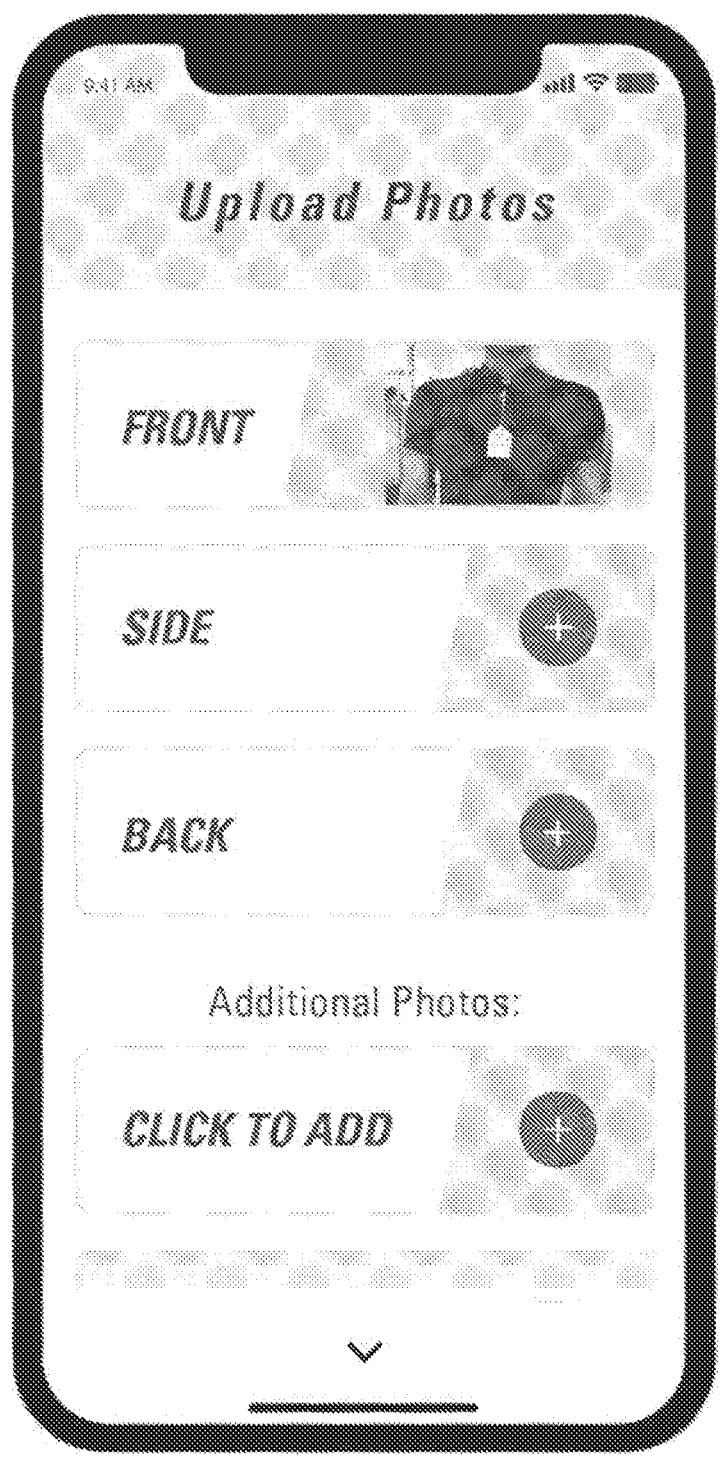
Figure 9D:
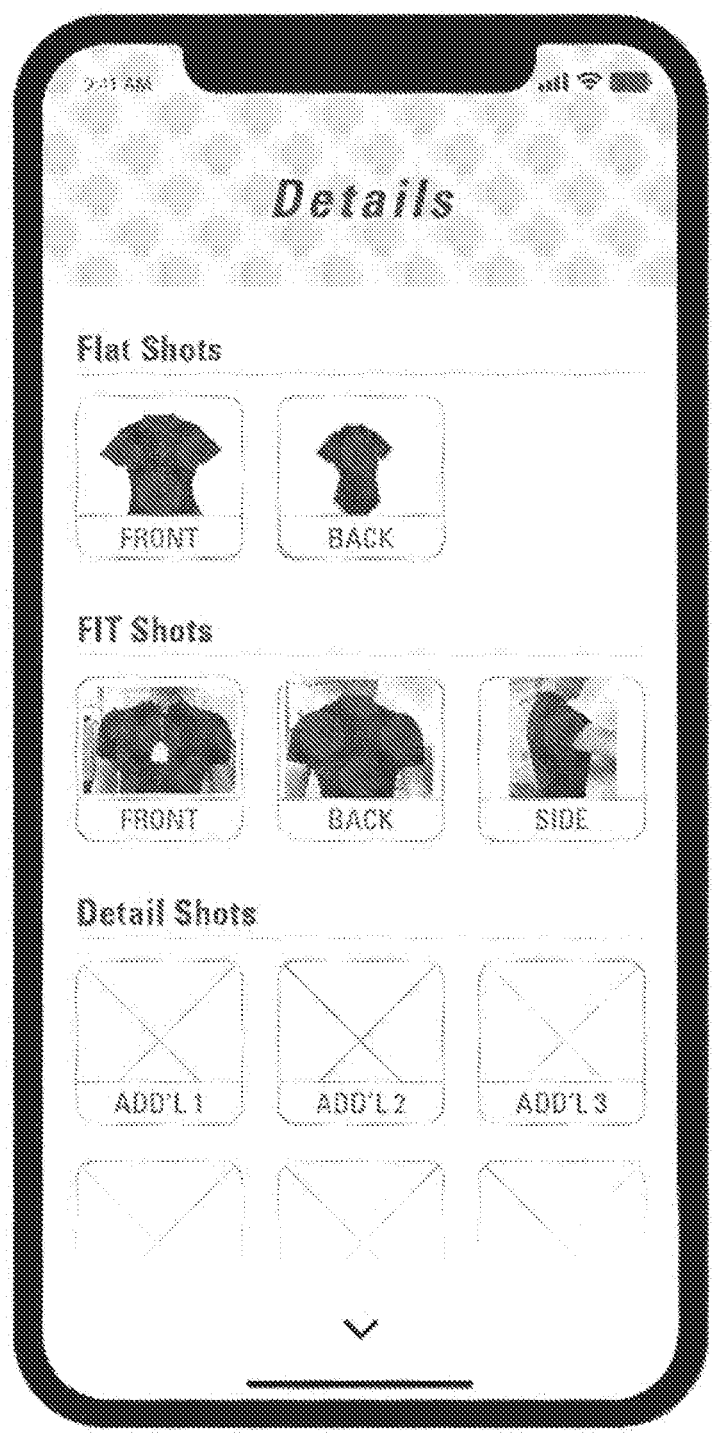

FIGS. 9C-9D illustrate an interface on the application enabling the user to add images of the garment during the fitting to the application.

Figure 9E:
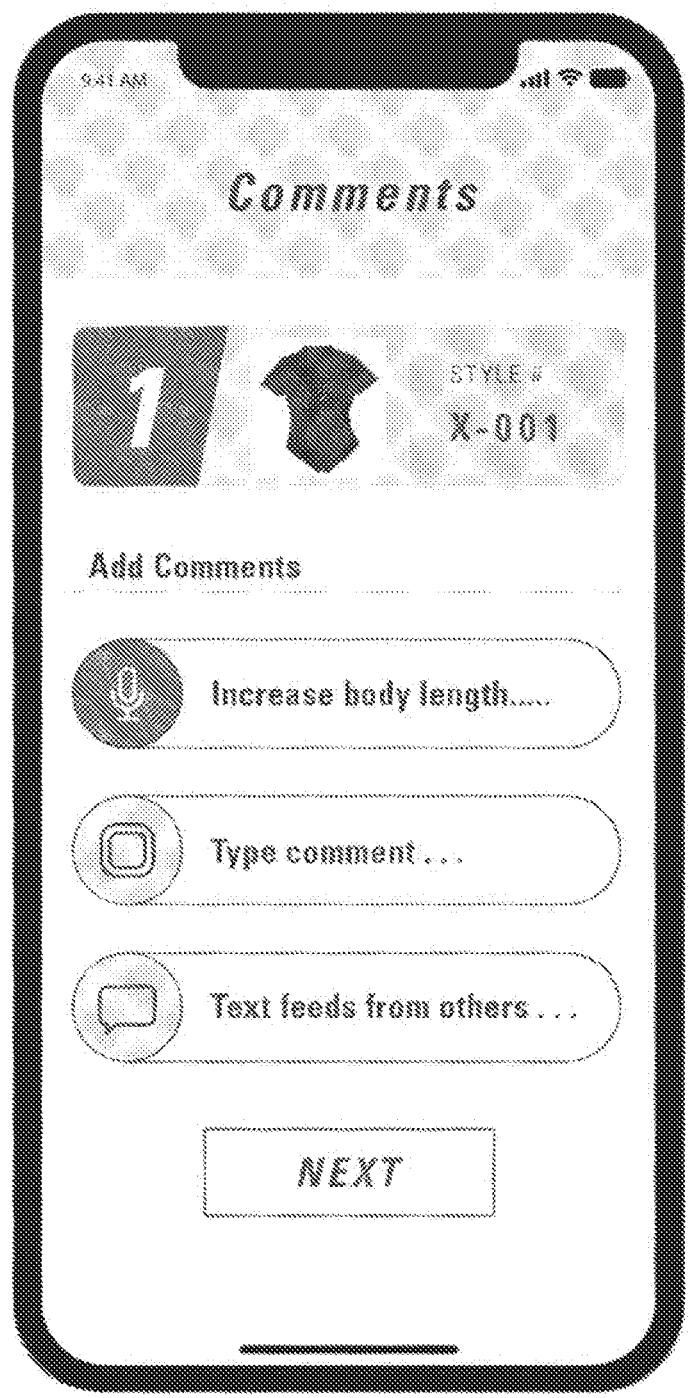
Figure 9F:
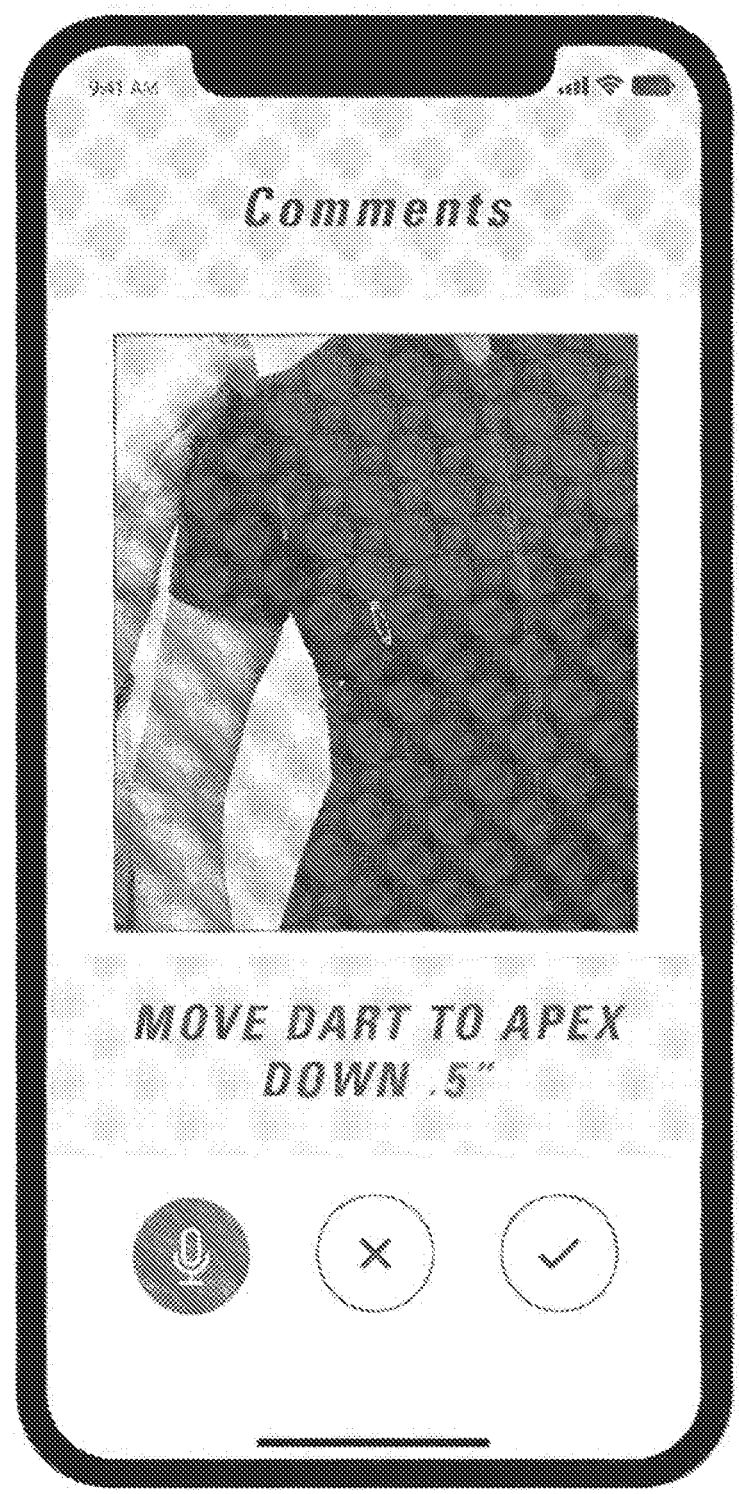
Figure 9G:

FIGS. 9E-9G illustrate an interface on the application enabling users to enter comments on the garment. Team members can add comments to the feed remotely. Shimmy data capsule is ready to push to PLM, Excel, or even email. An application records sample measurements and fit notes, for example in sample rooms, sessions with fit models, and on the factory floor.

Figure 9H:

FIG. 9H illustrates an interface on the application for selecting a next garment.

Figure 10:
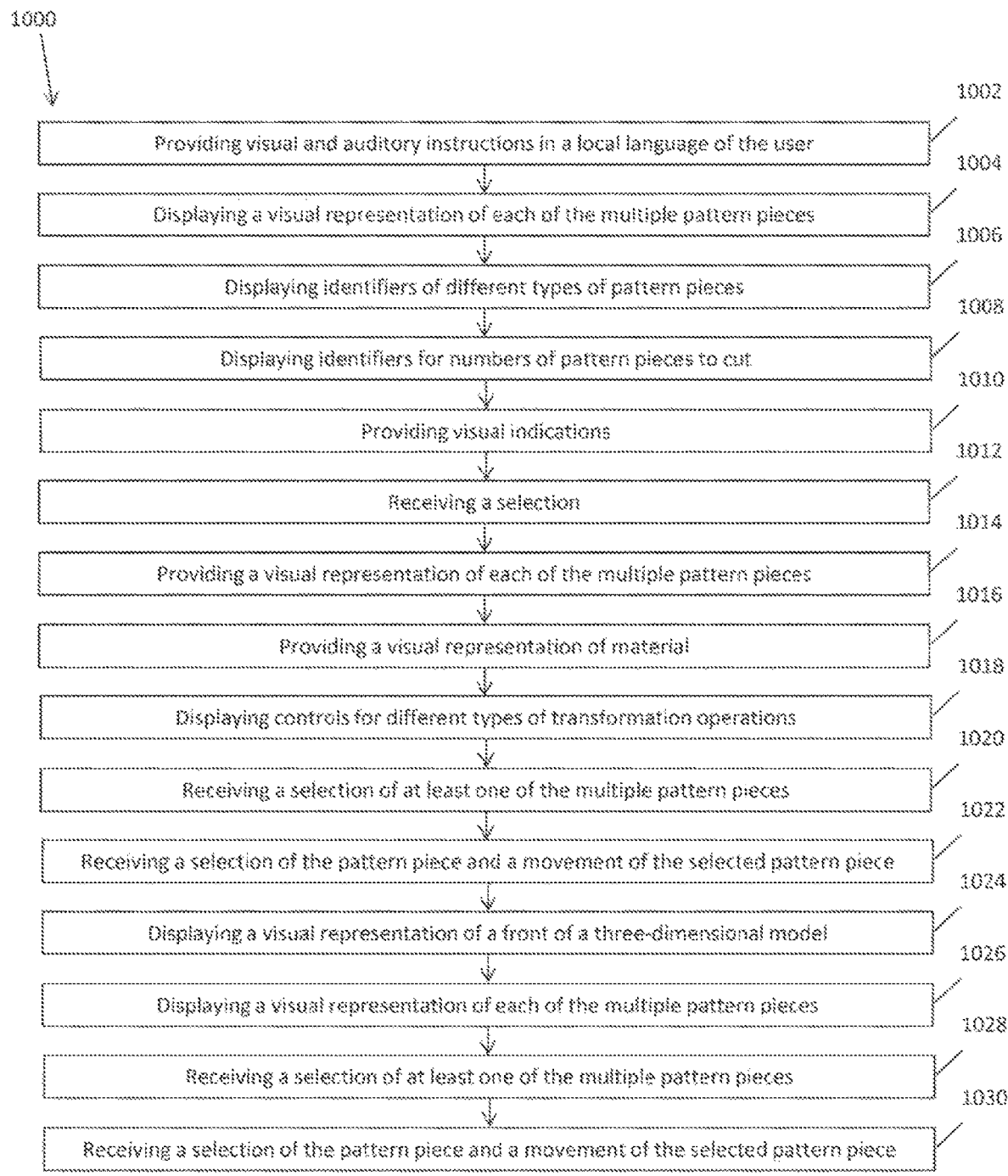
FIG. 10 schematically depicts a method for training a user to label and code digital files for three-dimensional garment design, in accordance with an exemplary embodiment.

FIG. 10 is a method 1000 for training a user to label and code digital files for three-dimensional garment design, in accordance with an exemplary embodiment. At step 1002, the method includes providing visual and auditory instructions in a local language of the user. At step 1004, the method includes displaying a visual representation of each of the multiple pattern pieces for identification of types of pattern pieces and numbers of pieces to cut. At step 1006, the method includes displaying identifiers of different types of pattern pieces, each identifier including a name of the type of pattern piece in the local language. At step 1008, the method includes displaying identifiers for numbers of pattern pieces to cut, each identifier including a name of the number of pattern pieces in the local language. For each pattern piece, at step 1010, the method includes receiving a selection of the visual representation of the pattern piece, receiving a selection of a corresponding identifier for the type of pattern piece, and providing a visual indication of whether the selection of the corresponding identifier for the type of pattern piece is correct. For each pattern piece, at step 1012, the method includes receiving a selection of a number of pattern pieces to cut and providing a visual indication of whether the selection of the number of pattern pieces to cut is correct. At step 1014, the method includes providing a visual representation of each of the multiple pattern pieces for layout for cutting with each visual representation including a grain line for the pattern piece. At step 1016, the method includes providing a visual representation of material on which to lay out the pattern pieces. At step 1018, the method includes displaying controls for different types of transformation operations. At step 1020, the method includes receiving a selection of at least one of the multiple pattern pieces, a selection of a control for a transformation operation on the selected at least one pattern piece, and displaying a visual representation of the transformation performed on the at least one pattern piece. For each of the multiple pattern pieces, at step 1022, the method includes receiving a selection of the pattern piece and a movement of the selected pattern piece onto the visual representation of the material and rendering the movement on the display. At step 1024, the method includes displaying a visual representation of a front of a three-dimensional model, and a visual representation of a back of a three-dimensional model for fitting the pattern to the model. At step 1026, the method includes displaying a visual representation of each of the multiple pattern pieces for fitting on the three-dimensional model. At step 1028, the method includes receiving a selection of at least one of the multiple pattern pieces, a selection of a control for a transformation operation on the selected at least one pattern piece, and displaying a visual representation of the transformation performed on the at least one pattern piece. For each of the multiple pattern pieces, at step 1030, the method includes receiving a selection of the pattern piece and a movement of the selected pattern piece onto the visual representation of the three-dimensional model and rendering the movement on the display.

Figure 11:
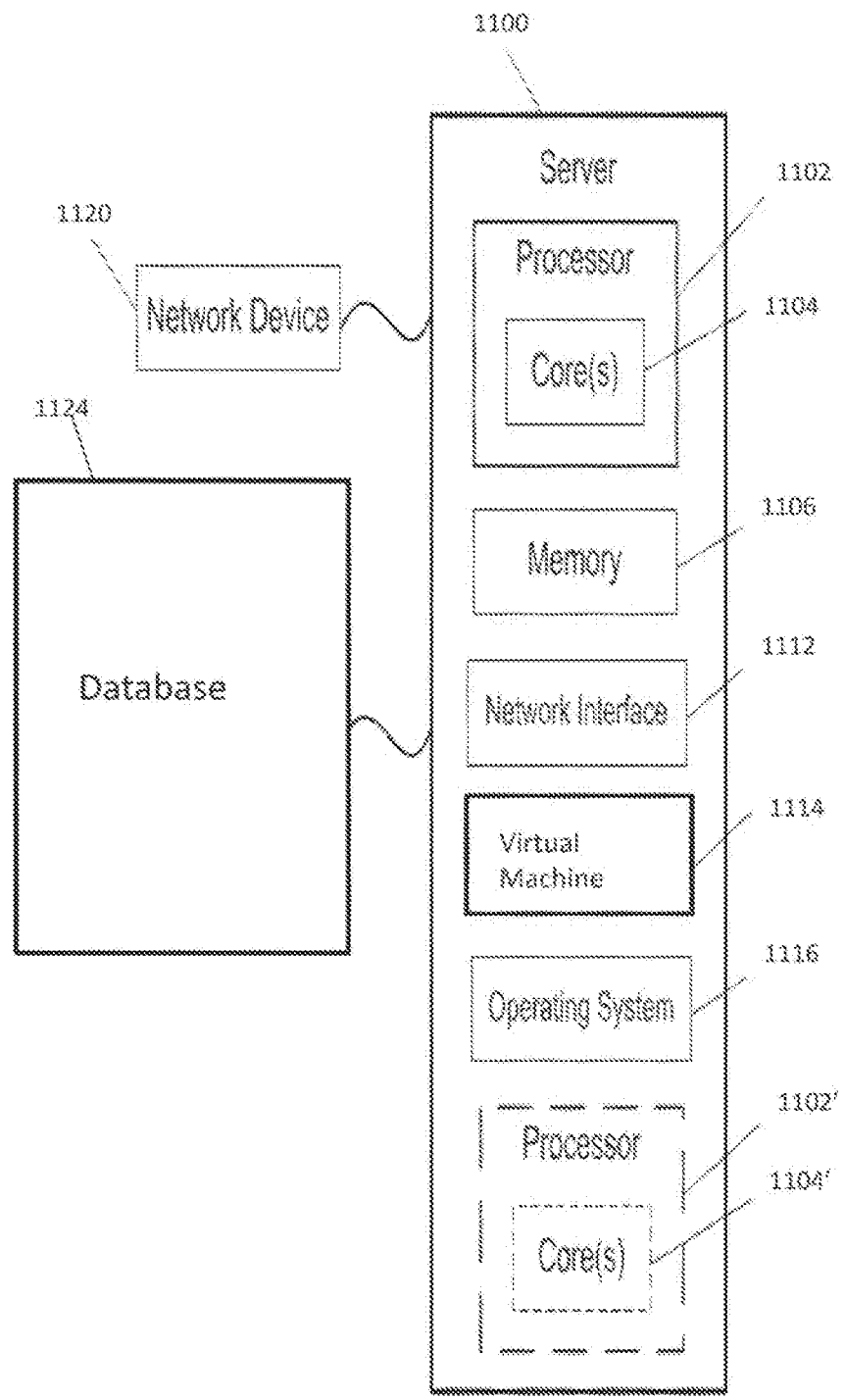
FIG. 11 is a block diagram of an example of a computing device that can be used to perform one or more steps provided by embodiments described herein.

FIG. 11 is a block diagram of an example computing device 1100 that can be used to perform one or more steps provided by embodiments described herein. In an exemplary embodiment, computing device 1100 is a computing device 104 and/or a computing device 110 shown in FIG. 1. Computing device 1100 includes one or more non-transitory computer-readable media for storing one or more computer-executable instructions or software for implementing embodiments described herein. The non-transitory computer-readable media can include, but are not limited to, one or more types of hardware memory, non-transitory tangible media (for example, one or more magnetic storage disks, one or more optical disks, one or more USB flash drives), and the like. For example, a memory 1106 included in computing device 1100 can store computer-readable and computer-executable instructions or software for implementing embodiments described herein. Computing device 1100 can also include a processor 1102 and an associated core 1104, and optionally, one or more additional processor(s) 1102' and associated core(s) 1104' (for example, in the case of computer systems having multiple processors/cores), for executing computer-readable and computer-executable instructions or software stored in memory 1106 and other programs for controlling system hardware. Processor 1102 and processor(s) 1102' can each be a single core processor or multiple core (1104 and 1104') processor. Computing device 1100 may further include an AR item generator engine.

Virtualization can be employed in computing device 1100 so that infrastructure and resources in the computing device can be shared dynamically. A virtual machine 1114 can be provided to handle a process running on multiple processors so that the process appears to be using only one computing resource rather than multiple computing resources. Multiple virtual machines can also be used with one processor.

Memory 1106 can include a computer system memory or random access memory, such as DRAM, SRAM, EDO RAM, and the like. Memory 1106 can include other types of memory as well, or combinations thereof. In some embodiments, a customer can interact with computing device 1100 through a visual display device, such as a touch screen display or computer monitor, which can display one or more customer interfaces that can be provided in accordance with embodiments. The visual display device may also display other aspects, elements and/or information or data associated with embodiments. Computing device 1100 may include other I/O devices for receiving input from a customer, for example, a keyboard or any suitable multi-point touch interface, such as a pointing device (e.g., a pen, stylus, mouse, or trackpad). The keyboard and pointing device may be coupled to visual display device. Computing device 1100 may include other suitable conventional I/O peripherals.

For example, where computing device 1100 is a mobile computing device (such as computing device 104), computing device 1100 may include a touch screen display, a camera, and a location module, and may execute an application that displays a map of the facility and displays virtual items in augmented reality.

Computing device 1100 can also include one or more storage devices 1124, such as a hard-drive, CD-ROM, or other computer-readable media, for storing data and computer-readable instructions and/or software. Exemplary storage device 1124 can also store one or more storage devices for storing any suitable information required to implement embodiments.

Computing device 1100 can include a network interface 1112 configured to interface via one or more network devices 1120 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. The network interface 1112 can include a built-in network adapter, network interface card, PCMCIA network card, card bus network adapter, wireless network adapter, USB network adapter, modem or any other device suitable for interfacing computing device 1100 to any type of network capable of communication and performing the operations described herein. Moreover, computing device 1100 can be any computer system, such as a workstation, desktop computer, server, laptop, handheld computer, tablet computer (e.g., the iPad® or Microsoft Surface® tablet computer), mobile computing or communication device (e.g., the iPhone® communication device), or other form of computing or telecommunications device that is capable of communication and that has sufficient processor power and memory capacity to perform the operations described herein.

Computing device 1100 can run any operating system 1116, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 1116 can be run in native mode or emulated mode. In an exemplary embodiment, the operating system 1116 can be run on one or more cloud machine instances.

The description herein is presented to enable any person skilled in the art to create and use a computer system configuration and related method and systems for generating virtual items within a facility. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps can be replaced with a single element, component or step. Likewise, a single element, component or step can be replaced with multiple elements, components or steps that serve the same purpose. Moreover, while embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

Although the present invention and its advantages have been described in detail, it should be understood that various changes, substitutions and alterations can be made herein without departing from the spirit and scope of the invention as defined in the appended claims.

The present invention will be further illustrated in the following Examples which are given for illustration purposes only and are not intended to limit the invention in any way.

The invention is further described by the following numbered paragraphs:

1. A system for training a user to label and code digital files for three-dimensional garment design, the system comprising:
    a database storing at least one digital file including a pattern having multiple pattern pieces;
    a user interface implemented through a computing device, the user interface configured to provide visual and auditory instructions in a local language of the user for each module in a plurality of learning modules; and
    computer executable instructions that when executed by one or more processors implement the plurality of learning modules including a setup for cutting module that:
    displays a visual representation of each of the multiple pattern pieces for identification of types of pattern pieces and numbers of pieces to cut;
    displays identifiers of different types of pattern pieces, each identifier including a name of the type of pattern piece in the local language;
    displays identifiers for numbers of pattern pieces to cut, each identifier including a name of the number of pattern pieces in the local language;
    for each pattern piece, receives a selection of the visual representation of the pattern piece, receives a selection of a corresponding identifier for the type of pattern piece, and provides a visual indication of whether the selection of the corresponding identifier for the type of pattern piece is correct; and
    for each pattern piece, receives a selection of a number of pattern pieces to cut and provides a visual indication of whether the selection of the number of pattern pieces to cut is correct.

2. The system of paragraph 1, further comprising computer executable instructions that when executed by the one or more processors implement a creation of markers for layout module that:
    provides a visual representation of each of the multiple pattern pieces for layout for cutting with each visual representation including a grain line for the pattern piece;
    provides a visual representation of material on which to lay out the pattern pieces;
    displays controls for different types of transformation operations; receives a selection of at least one of the multiple pattern pieces, a selection of a control for a transformation operation on the selected at least one pattern piece, and displays a visual representation of the transformation performed on the at least one pattern piece; and
    for each of the multiple pattern pieces, receives a selection of the pattern piece and a movement of the selected pattern piece onto the visual representation of the material and rendering the movement and positioning of the selected pattern piece on a display of the user interface.

3. The system of paragraph 2, further comprising computer executable instructions that when executed by the one or more processors implement a digital assembly module that:
    displays a visual representation of a front side of a three-dimensional model, and a visual representation of a back side of a three-dimensional model for fitting the pattern to the model;
    displays a visual representation of each of the multiple pattern pieces for fitting on the three dimensional model;
    receives a selection of at least one of the multiple pattern pieces, a selection of a control for a transformation operation on the selected at least one pattern piece, and display a visual representation of the transformation performed on the at least one pattern piece; and
    for each of the multiple pattern pieces, receives a selection of the pattern piece and a movement of the selected pattern piece onto one of the visual representations of the three-dimensional model and rendering the movement and positioning of the selected pattern piece on the display of the user interface.

4. The system of any one of paragraphs 1-3, further comprising computer executable instructions that when executed by the one or more processors implement a pattern piece identification module that:
   displays examples of different types of pattern pieces each labeled with the type of pattern piece in the local language;
   for each example pattern piece, prompts the user to speak the name of the type of example pattern piece in the local language, and records the spoken name of the type of example pattern piece; and provides data representative of the spoken name of the example pattern along and an identification of the type of example pattern piece to a natural language processing system to improve natural language processing of garment-related language in the user's local language with the user's dialect.

5. The system of paragraph 4, wherein the pattern piece identification module further:
   displays a visual representation of each of the multiple pattern pieces for identification of the pattern pieces;
   displays identifiers of different types of pattern pieces, each identifier including a name of the type of pattern piece in the local language; and
   for each pattern piece, receives a selection of the visual representation of the pattern piece, receives a selection of a corresponding identifier for the type of pattern piece, and provides a visual indication of whether the selection of the corresponding identifier for the type of pattern piece is correct.

6. The system of any one of paragraphs 2-5, wherein the display of controls for different types of transformation operations includes display of schematic depictions of the transformation operations.

7. The system of any one of paragraphs 1-6, wherein the display of identifiers of different types of pattern pieces and the display of the one or more identifiers for numbers of pattern pieces to cut is in response to receiving the selection of the visual representation of the pattern piece.

8. The system of any one of paragraphs 2-7, wherein the display of controls for different types of transformation operations is in response to the selection of at least one of the multiple pattern pieces.

9. The system of any one of paragraphs 2-8, wherein the transformation operations include rotate, reflect, and copy.

10. The system of any one of paragraphs 1-9, further comprising computer executable instructions that when executed by the one or more processors cause the user interface to: display a login interface to the user; and receive information regarding a username and a password from the user.

11. The system of any one of paragraphs 1-9, further comprising computer executable instructions that when executed by the one or more processors cause the system to access information regarding a mobile address of the computing device and store the accessed information regarding the mobile address and information associating the mobile address with a user.

12. The system of any one of paragraphs 1-11, further comprising computer executable instructions that when executed by the one or more processors cause the system to store information regarding the users' completion of each module associated with information identifying the user.

13. The system of any one of paragraphs 1-12, further comprising computer executable instructions that, when executed by the one or more processors, cause the system to record information regarding correct and incorrect selections by the user, regarding correct and incorrect positioning of pattern pieces on the visual representation of the material, regarding correct and incorrect movements of pattern pieces onto the visual representation of the material, and/or regarding correct and in movements of pattern pieces onto the visual representations of the three-dimensional model.

14. The system of any one of paragraphs 1-13, further comprising computer executable instructions that, when executed by the one or more processors, cause the system to transmit information to the user via the computing device after completion of one or more modules.

15. The system of paragraph 14, wherein the information transmitted is based, at least in part, on one or more scores of the user's performance during one or more of the learning modules.

16. The system of any one of paragraphs 1-15, further comprising computer executable instructions that, when executed by the one or more processors, cause the user interface to display graphical indicators of successful completion of one or more modules within a training session and during one or more prior training sessions.

17. The system of any one of paragraphs 1-16, wherein the user interface is implemented and the plurality of learning modules are implemented as a web-based application on the computing device that is hosted by a remote server.

18. The system of any one of paragraphs 1-17, wherein the computing device comprises a touch screen and at least some of the user selections are received via a touch screen interface of the computing device.

19. A method for training a user to label and code digital files for three-dimensional garment design, the method comprising:
   providing visual and auditory instructions in a local language of the user on a computing device;
   displaying a visual representation of each of the multiple pattern pieces for identification of types of pattern pieces and numbers of pieces to cut;
   displaying identifiers of different types of pattern pieces, each identifier including a name of the type of pattern piece in the local language;
   displaying identifiers for numbers of pattern pieces to cut, each identifier including a name of the number of pattern pieces in the local language;
   for each pattern piece, receiving a selection of the visual representation of the pattern piece, receiving a selection of a corresponding identifier for the type of pattern piece, and providing a visual indication of whether the selection of the corresponding identifier for the type of pattern piece is correct; and
   for each pattern piece, receiving a selection of a number of pattern pieces to cut and providing a visual indication of whether the selection of the number of pattern pieces to cut is correct.

20. The method of paragraph 19, further comprising:
   providing a visual representation of each of the multiple pattern pieces for layout for cutting with each visual representation including a grain line for the pattern piece;
   providing a visual representation of material on which to lay out the pattern pieces;
   displaying controls for different types of transformation operations; receiving a selection of at least one of the multiple pattern pieces, a selection of a control for a transformation operation on the selected at least one pattern piece, and displaying a visual representation of the transformation performed on the at least one pattern piece; and for each of the multiple pattern pieces, receiving a selection of the pattern piece and a movement of the selected pattern piece onto the visual representation of the material and rendering the movement on a display of the computing device.

21. The method of paragraph 19 or paragraph 20, further comprising:

displaying a visual representation of a front of a three-dimensional model and a visual representation of a back of a three-dimensional model for fitting the pattern to the model;

displaying a visual representation of each of the multiple pattern pieces for fitting on the three-dimensional model;

receiving a selection of at least one of the multiple pattern pieces, a selection of a control for a transformation operation on the selected at least one pattern piece, and displaying a visual representation of the transformation performed on the at least one pattern piece; and for each of the multiple pattern pieces, receiving a selection of the pattern piece and a movement of the selected pattern piece onto the visual representation of the material and rendering the movement on the display.

22. The method of any one of paragraphs 19-21, further comprising:

displaying examples of different types of pattern pieces each labeled with the type of pattern piece in the local language;

for each example pattern piece, prompting the user to speak the name of the type of example pattern piece in the local language, and recording the spoken name of the type of example pattern piece; and providing data representative of the spoken name of the example pattern along and an identification of the type of example pattern piece to a natural language processing system to improve natural language processing of garment-related language in the user's local language with the user's dialect.

23. The method of any one of paragraphs 19-22, further comprising:

displaying a visual representation of each of the multiple pattern pieces for identification of the pattern pieces;

displaying identifiers of different types of pattern pieces, each identifier including a name of the type of pattern piece in the local language; and for each pattern piece, receiving a selection of the visual representation of the pattern piece, receive a selection of a corresponding identifier for the type of pattern piece, and providing a visual indication of whether the selection of the corresponding identifier for the type of pattern piece is correct.

24. The method of any one of any one of paragraphs 20-23, wherein displaying controls for different types of transformation operations includes displaying schematic depictions of the transformation operations.

25. The method of any one of paragraphs 19-24, wherein the displaying of identifiers of different types of pattern pieces and the displaying of the one or more identifiers for numbers of pattern pieces to cut is in response to receiving the selection of the visual representation of the pattern piece.

26. The method of any one of paragraphs 19-25, wherein the displaying of controls for different types of transformation operations is in response to the selection of at least one of the multiple pattern pieces.

27. The method of any one of paragraphs 20-26, wherein the transformation operations include rotate, reflect, and copy.

28. The method of any one of paragraphs 19-27, further comprising:

displaying a login interface to the user; and receiving information regarding a username and a password from the user.

29. The method of any one of paragraphs 19-27, further comprising accessing information regarding a mobile address of the computing device and storing the accessed information regarding the mobile address and information associating the mobile address with a user.

30. The method of any one of paragraphs 19-29, further comprising storing information regarding the users' completion of each module associated with information identifying the user.

31. The method of paragraph 30, further comprising recording information regarding correct and incorrect selections by the user, regarding correct and incorrect positioning of pattern pieces on the visual representation of the material, regarding correct and incorrect movements of pattern pieces onto the visual representation of the material, and/or regarding correct and in movements of pattern pieces onto the visual representations of the three-dimensional model.

32. The method of any one of paragraphs 19-31, further comprising transmitting information to the user via the computing device after completion of one or more modules.

33. The method of paragraph 32, wherein the information transmitted is based, at least in part, on one or more scores of the user's performance during one or more of the learning modules.

34. The method of any one of paragraphs 19-33, further comprising providing graphical indicators of successful completion of one or more modules within a training session and during one or more prior training sessions.

35. The method of any one of paragraphs 19-34, wherein the method is implemented as a web-based application on the computing device that is hosted by a remote server.

36. The method of any one of paragraphs 19-35, wherein at least some of the user selections are received via a touch screen interface of the computing device.

37. A system for collaborative refining of digital and/or physical garment prototypes, the system comprising:

a database of a plurality of apparel computer aided design (CAD)-based models; and an application accessed via a computing device and communicatively coupled to the database, the application configured to:

receive information identifying a first selected apparel CAD-based model of the plurality of apparel CAD-based models; display a graphical representation of the first selected apparel CAD-based model;

modify a view of the graphical representation of the first selected apparel CAD-based model based on user input received via a user interface of the computing device;

display annotation tools for annotation of the first selected apparel CAD-based model and receive input for annotation from a user via the annotation tools or via speech processed via a natural language processing tool; and display an indication of the annotation on the display of the graphical representation of the identified apparel CAD-based model.

38. The system of paragraph 37, wherein the application is further configured to:

store the annotation input associated with the first selected CAD-based modal in the database and store a time that the input for annotation was received or a time that the annotation input was stored;

receive from a user, an identification of a file to be uploaded, associated with the first selected apparel CAD-based model; and store the identified file associated with the first selected apparel CAD-based model in the database.

39. The system of paragraph 37 or paragraph 38, wherein the application is further configured to provide a notification to one or more additional users regarding a change in or an addition to the stored information associated with the first selected apparel CAD-based model in the database.

40. The system of any one of paragraphs paragraph 37-40, wherein the system further comprises the application executing on a second computing device, wherein the application executed on the second computing device is further configured to:

receive information identifying the first selected apparel CAD-based model; and display a graphical representation of the first selected apparel CAD-based model including an indication of the annotation.

41. The system of paragraph 40, where the second computing device has a default language preference different than a language of the annotation input, the application executing on the second computing device is further configured to display the annotation input in the default language of the second computing device.

42. The system of paragraph 40 or 41, wherein the application executing on the second computing device is further configured to:

receive a second annotation input from a user of the second computing device; and store the second annotation input associated with the first selected CAD-based modal in the database.

43. The system of any one of paragraphs 37-42, wherein the information identifying a first selected apparel CAD-based model of the plurality of apparel CAD-based models obtained from image data acquired from an imaging device of the computing device.

44. The system of any one of paragraphs 37-43, wherein the application is further configured to:

display information regarding the identified first selected apparel CAD-based model; and request confirmation of the selection of the identified first selected apparel CAD-based model.

45. The system of any one of paragraphs 37-44, wherein the application is further configured to guide a user through a fit session for the identified first selected apparel CAD-based model.

46. The system of paragraph 45, wherein guiding the user through the fit session for the identified first selected apparel CAD-based model comprises:

displaying a request for one or more photos of a garment corresponding to the first selected apparel CAD-based model on a fit model and enabling the user to select one or more photos for upload or displaying one or more previously uploaded photos of the garment on a fit model.

47. The system of paragraph 45 or 46, wherein guiding the user through a fit session for the identified first selected apparel CAD-based model comprises, for each of a plurality of points of measure:

providing a graphical description of the point of measure; receiving an audio input from a user regarding the point of measure; and displaying a numerical value corresponding to the user's audio input for the point of measure and graphical indicators for acceptance or rejection of the numerical value.

48. The system of paragraph 47, wherein guiding the user through a fit session for the identified first selected apparel CAD-based model further comprises, for each of the plurality of points of measure: displaying a graphical indication of whether the accepted numerical value corresponding to the user's audio input for the point of measure is within tolerance for the model.

49. The system of any one of paragraphs 45-48, wherein guiding the user through a fit session for the identified first selected apparel CAD-based model further comprises:

displaying a prompt for the user to provide audio comments regarding the fit; and receiving audio input from the user regarding the fit and displaying comment text corresponding to the audio input, the audio input converted to text via natural language processing relying on a garment-specific corpus of language.

50. The system of any one of paragraphs 45-49, wherein guiding the user through a fit session for the identified first selected apparel CAD-based model further comprises:

displaying comments of other users regarding the apparel CAD-based model or the fit.

51. The system of any one of paragraphs 37-50, wherein application is implemented as a web based application on the computing device that is hosted by a remote server.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A system for implementing a machine learning (ML)-based method for training a user to label, code, and generate digital three-dimensional garment files that correspond to construction of a physical textile garment with minimization of fabric waste, the system comprising:

(a) a computing device comprising:
  (i) a processor and a ML engine configured to process historical and real-time user interaction data to facilitate an adaptive refinement of user training processes; and
  (ii) a data storage unit communicatively coupled to the processor, the data storage unit storing comprising:
    (1) a digital garment database comprising a pattern, the pattern comprising pattern pieces corresponding to portions of the physical textile garment, wherein the digital garment database is updated based on inputs processed through the ML engine;
    (2) user interaction and training data, wherein the ML engine is configured to process said user interaction and training data, including recorded user progress and error information, to facilitate a dynamic refinement of the training process presented to the user; and
    (3) ML models and natural language processing (NLP) data, wherein said ML models are trained to analyze user input to assess user performance and provide feedback aimed at improving pattern recognition and pronunciation related to garment-language processing;

(b) non-transitory computer-readable media, coupled to the processor, storing computer-executable instructions that, when executed, implement:
  (i) a ML-enhanced user interface, configured to:

(A) provide visual and auditory training instructions to the user in a local language of the user;

(B) display interactive exercises for digital garment construction to the user and, in response to ML processing of recorded user learning patterns, adjust a difficulty level of said interactive exercises based on the user's learning patterns using ML analysis; and (C) in response to ML processing of current and prior user input, identify-errors and provide personalized feedback to the user; and (ii) a sequence of learning modules, wherein user progression through or a configuration of each module is influenced by ML processing of the user's recorded demonstrated proficiency in each of the learning modules, the learning modules comprising:

(A) a pattern piece identification module, configured to:

(I) display a visual representation of pattern pieces for identification by the user; wherein user selections are verified with assistance from ML-based pattern recognition processing of the visual representation and user selection;

(II) process pattern piece identifiers using an ML-trained NLP system that refines terminology recognition by correlating user dialect variations with stored garment terminology; and (III) for each pattern piece: prompt the user to recite a spoken name of the pattern piece type in the local language, record the spoken name, and utilize ML-based NLP processing of the recorded spoken name to improve recognition accuracy for garment-related language by comparing the recorded spoken name to stored pronunciation data;

(B) an artificial intelligence (AI)-powered cutting module, configured to:

(I) display pattern pieces for layout and provide recommendations for reducing material waste, said recommendations being generated from ML-driven optimization processing that assesses fabric efficiency based on pattern piece geometry and material characteristics;

(II) provide validation feedback based on ML processing of user selections and pattern arrangements, said feedback indicating incorrect pattern selections and suggesting alternative pattern arrangements derived from learned user behaviors;

(III) utilize ML-powered data analytics, which learn from past user interactions and stored fabric usage guidelines, to iteratively improve said pattern arrangement optimization processing;

(C) an ML-enhanced digital assembly module, configured to:

(I) display a digital three-dimensional garment model with alignment guides, wherein said guides are generated by ML processing of common user error patterns to assist in avoiding such errors before final placement;

(II) validate pattern piece placement accuracy by comparing user placement to stored garment construction data using ML-based computer processing;

(III) provide adaptive feedback based on user performance trends, wherein guidance parameters and error detection thresholds are adjusted by ML processing based on the user's proficiency over time;

wherein the system continuously refines training content, instructional feedback, and garment construction simulations through ML-driven processing of user interaction data, enabling real-time adaptation of training to user proficiency levels and optimizing pattern identification and assembly accuracy for enhancing garment manufacturing efficiency while minimizing fabric waste.

2. The system of claim 1, wherein the AI-powered cutting module (B) further comprises:

(a) ML-powered transformation operations, wherein the system is configured to provide for ML-powered transformation operations by:

(i) displaying controls for different types of transformation operations;

(ii) receiving a selection of at least one of the multiple pattern pieces and a selection of a control for a transformation operation on the selected at least one pattern piece, and (iii) using ML-trained alignment models to assist in refining and optimizing pattern placement;

(b) ML-driven comparison and correction, wherein the system is further configured to perform ML-driven comparison and correction by:

(i) upon receiving a user's selection of the pattern piece and a movement of the selected pattern piece onto the visual representation of the material, comparing the selected positioning to an AI-generated optimal placement model generated from AI processing of historical placement data;

(ii) recording correct and incorrect positioning of the selected pattern piece and using the recorded positioning data to train ML models to improve future recommendations; and (iii) transmitting feedback to the user, wherein the feedback includes suggestions for optimal positioning of the pattern piece generated from ML processing of placement data;

whereby the ML-based comparison of the positioning of the selected pattern piece with the corresponding positioning of the pattern piece on the corresponding textile garment to model correct positioning of the selected pattern piece enables the user to construct the digital three-dimensional garment and corresponding textile garment.

3. The system of claim 1, wherein when the user executes the ML-enhanced digital assembly module (C):

(a) the system displays to the user AI-generated three-dimensional garment models for interaction, comprising:

(i) a visual representation of a front side and a back side of a three-dimensional model generated by ML processing for fitting the pattern to the model; and (ii) a visual representation of each of the multiple pattern pieces for fitting on the three-dimensional model;

(b) the system performs ML-powered real-time assembly analysis, wherein the system:

(i) receives a user's selection of a pattern piece and applies a transformation operation:

(ii) generates an analysis of the transformation's accuracy using trained ML algorithms and provides real-time visual corrections;

(iii) compares selected positioning of the pattern piece with optimal placements generated by ML processing;

(iv) records correct and incorrect movements of pattern pieces and continuously improves ML models using the recorded user interaction data; and (c) the system performs adaptive learning optimization, wherein:

(i) the system tracks user improvement over time and dynamically adjusts error correction thresholds based on ML processing of said user improvement; and (ii) the system generates suggestions for corrections based on prior before final placement;

whereby the ML-powered digital assembly module continuously improves user training efficiency and accuracy in constructing the digital three-dimensional garment and corresponding textile garment.

4. The system of claim 1, wherein the ML-enhanced pattern piece identification module (A) is further configured to:

(a) display a visual representation of pattern pieces, wherein:

(i) the system verifies user selections with assistance from ML-based pattern recognition models;

(b) implement ML-enhanced NLP for pattern recognition, wherein:

(i) pattern piece identifiers are processed through a ML-trained NLP system;

(ii) the system refines garment terminology recognition by processing user dialect variations against stored terminology;

(iii) the system records and learns from incorrect user pronunciations to inform future adaptive feedback to the user;

(c) perform ML-driven user interaction tracking, wherein:

(i) for each pattern piece, the system monitors user accuracy trends and generates feedback based on ML processing to assist in avoiding potential errors;

(ii) the system generates adaptive learning paths by adjusting training complexity based on ML processing of the user's historical proficiency;

whereby the pattern piece identification module dynamically adapts through ML, improving user accuracy and efficiency in garment construction.

5. The system of claim 1, wherein:

(a) the system dynamically displays pattern piece identifiers by using ML-driven learning progression models, to adjust:

(i) the order and complexity of training modules based on ML processing of the user's proficiency; and (ii) the selection and display of identifiers in response to user interactions;

(b) the system comprises ML-based authentication and user management, wherein:

(i) the system adapts access settings based on an analysis of login patterns using ML processing; and (ii) the system optimizes mobile access settings based on connectivity prediction generated from AI processing; and (c) the system implements ML-optimized web hosting, wherein:

(i) the web-based application dynamically adjusts bandwidth and processing allocation based on ML processing of user load data; and (ii) the system's ML-powered interface optimizes rendering speeds based on ML processing of user interaction and system performance data.

6. The system of claim 1, further comprising ML-driven performance tracking, wherein:

(a) the system transmits adaptive learning reports to the user, wherein:

(i) insights generated from ML processing of performance data determine the user's strongest and weakest skills; and (ii) the system provides targeted improvement plans generated using said historical performance data;

whereby the system leverages ML to continuously refine training effectiveness and user engagement.

7. The system of claim 6, wherein the ML-based performance analytics generate:

(a) custom feedback reports, personalized to the user's proficiency trends based on ML processing of said trends;

(b) predictive learning paths generated by AI processing, which recommend subsequent training modules based on prior performance; and (c) real-time difficulty adjustments, wherein the system alters training difficulty in response to ML processing of user progression patterns whereby the ML-powered training system dynamically adjusts to user needs, ensuring efficient and personalized learning.

8. A method for implementing a ML-based method for training a used to label, code, and generate digital three-dimensional garment files that correspond to construction of a digital three-dimensional garment construction and a corresponding textile garment through completion of a plurality of learning modules, the method comprising:

providing the user with the system of claim 1; and wherein in use of the system, the data storage unit stores information regarding the user's progress of each learning module associated with information identifying the user;

the system, via the ML engine compares, using ML-based comparison models:

positioning of pattern pieces on a visual representation of a material with corresponding positioning of the pattern pieces of a model of the corresponding textile garment; and movements of pattern pieces onto the visual representation of the material with corresponding movements of the pattern pieces of the corresponding textile garment, and movements of pattern pieces onto a visual representations of a three-dimensional model with corresponding movement of the pattern pieces of the corresponding textile garment;

based on the comparisons with the corresponding textile garment, the system records information regarding correct and incorrect selections by the user, regarding correct and incorrect positioning of pattern pieces on the visual representation of the material, regarding correct and incorrect movements of pattern pieces onto the visual representation of the material, and regarding correct and incorrect movements and arrangement of pattern pieces onto the visual representations of the three-dimensional model for construction of the digital three-dimensional garment;

wherein for each pattern piece, upon receipt of a selection of the visual representation of the pattern piece and a selection of a corresponding identifier for the type of pattern piece, the system compares the selection of the visual representation of the pattern piece and the selection of the corresponding identifier for the type of pattern piece with a corresponding pattern piece of the corresponding textile garment, and provides to the user a visual indication of whether the selection of the corresponding identifier for the type of pattern piece is correct based on the comparison for construction of the digital three-dimensional garment; and wherein for each pattern piece, upon receipt of a selection of a number of pattern pieces to cut, the system compares the selection of the number of pattern pieces to cut with a corresponding number of pattern pieces to cut in the corresponding textile garment, and provides to the user a visual indication of whether the selection of the number of pattern pieces to cut is correct for construction of the digital three-dimensional garment.

9. The method of claim 8, wherein the ML-enhanced digital assembly; provides a visual representation of each of the multiple pattern pieces for layout for cutting with each visual representation including a grain line for the pattern piece;

the system displays a visual representation of material on which to lay out the pattern pieces;

the system displays controls for different types of transformation operations; receives a selection of at least one of the multiple pattern pieces and a selection of a control for a transformation operation on the selected at least one pattern piece, whereby the system displays a visual representation of the transformation performed on the at least one pattern piece; and wherein for each of the multiple pattern pieces, upon receipt of a selection of the pattern piece and a movement of the selected pattern piece onto the visual representation of the material to render the movement on a display of the computing device, the system compares the selection of the pattern piece and positioning of the selected pattern piece on the visual representation of the material with a corresponding positioning of the pattern piece on the corresponding textile garment, records information regarding correct and incorrect positioning of the selected pattern piece on the visual representation of the material on which to lay out the pattern piece based on the comparison with the corresponding positioning of the pattern piece on the corresponding textile garment, and transmits said information to the user.

10. The method of claim 8, wherein the system displays a visual representation of a front of a three-dimensional model and a visual representation of a back of a three-dimensional model for fitting the pattern to the model;

the system displays a visual representation of each of the multiple pattern pieces for fitting on the three-dimensional model;

the system receives a selection of at least one of the multiple pattern pieces, a selection of a control for a transformation operation on the selected at least one pattern piece, whereby the system displays a visual representation of the transformation performed on the at least one pattern piece; and wherein for each of the multiple pattern pieces, upon receipt of a selection of the pattern piece and a movement of the selected pattern piece onto the visual representation of the material to render the movement on the display, the system compares the selection of the pattern piece and positioning of the selected pattern piece on the visual representation of the material with corresponding movements of the pattern piece on the corresponding textile document, records information regarding correct and incorrect movements of pattern pieces onto the visual representations of the three-dimensional model based on the comparison with the corresponding movements on the corresponding textile garment, and transmits said information regarding correct and incorrect movements of pattern pieces onto the visual representations of the three-dimensional model to the user;

or the system displays examples of different types of pattern pieces each labeled with the type of pattern piece in the local language;

for each example pattern piece, prompting the user to speak the name of the type of example pattern piece in the local language, and recording the spoken name of the type of example pattern piece; and providing data representative of the spoken name of the example pattern along and identification of the type of example pattern piece to a natural language processing system to improve a natural language processing of garment-related language in the user's local language with the user's dialect;

or the pattern piece identification module displays a visual representation of each of the multiple pattern pieces for identification of the pattern pieces;

the system displays identifiers of different types of pattern pieces, each identifier including a name of the type of pattern piece in the local language; and wherein for each pattern piece, upon receipt of a selection of the visual representation of the pattern piece and a selection of a corresponding identifier for the type of pattern piece, the system compares the selection of the visual representation of the pattern piece and the selection of the corresponding identifier for the type of pattern piece with a corresponding pattern piece of the corresponding textile garment and provides to the user a visual indication of whether the selection of the corresponding identifier for the type of pattern piece is correct based on the comparison;

or wherein display of identifiers of different types of pattern pieces and display of the one or more identifiers for numbers of pattern pieces to cut by the system is in response to receipt of the selection of the visual representation of the pattern piece by the user;

or wherein display of controls for different type of transformation operations by the system is in response to the selection of at least one of the multiple pattern pieces by the user;

or the system displays a login interface to the user; and the system receives information regarding a username and password from the user;

or the ML engine accesses information regarding a mobile address of the computing device and sorts the accessed information regarding the mobile address and information to associate the mobile address with a user or the system provides providing graphical indicators of successful completion of one or more modules within a training session and during one or more prior training sessions.

11. The method of claim 10, wherein the system displays controls for different types of transformation operations includes displaying schematic depictions of the transformation operations.

12. The method of claim 10, wherein the transformation operations include rotate, reflect, and copy.

13. The method of claim 8, wherein the system transmits information to the user via the computing device after completion of one or more learning modules.

14. The method of claim 13, wherein the information transmitted by the system is based-on one or more score reflecting the user's performance during one or more of the learning modules.

* * * * *